(12) United States Patent
Huang et al.

(10) Patent No.: US 8,432,622 B2
(45) Date of Patent: Apr. 30, 2013

(54) IMAGE CAPTURING LENS SYSTEM

(75) Inventors: Hsin-Hsuan Huang, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/337,166

(22) Filed: Dec. 26, 2011

(65) Prior Publication Data

US 2013/0016436 A1 Jan. 17, 2013

(30) Foreign Application Priority Data

Jul. 15, 2011 (TW) .................. 100125158

(51) Int. Cl.
*G02B 9/34* (2006.01)
(52) U.S. Cl.
USPC .................. 359/781; 359/715; 359/771
(58) Field of Classification Search .................. 359/708, 359/713–715, 753, 754, 755, 756, 761, 763, 359/770, 781
See application file for complete search history.

(56) References Cited

U.S. PATENT DOCUMENTS

| 7,085,077 | B1 | 8/2006 | Noda |
| 7,230,775 | B2 * | 6/2007 | Kato .............................. 359/745 |
| 7,365,920 | B2 | 4/2008 | Noda |

* cited by examiner

*Primary Examiner* — Darryl J Collins
*Assistant Examiner* — Gary O'Neill
(74) *Attorney, Agent, or Firm* — CKC & Partners Co., Ltd.

(57) ABSTRACT

An image capturing lens system includes, in order from an object side to an image side, a first lens element, a second lens element, a third lens element and a fourth lens element. The first lens element with negative refractive power has a convex object-side surface and a concave image-side surface. The second lens element with positive refractive power has a concave object-side surface and a convex image-side surface. The third lens element with negative refractive power is made of plastic material, and has a concave image-side surface, wherein an object-side surface and the image-side surface of the third lens element are aspheric. The fourth lens element with positive refractive power is made of plastic material, wherein an object-side surface and an image-side surface of the fourth lens element are aspheric.

21 Claims, 19 Drawing Sheets

IMAGE CAPTURING LENS SYSTEM

RELATED APPLICATIONS

The application claims priority to Taiwan Application Serial Number 100125158 filed Jul. 15, 2011, which is herein incorporated by reference.

BACKGROUND

1. Technical Field

The present disclosure relates to an image capturing lens system. More particularly, the present disclosure relates to a compact image capturing lens system applicable to electronic products.

2. Description of Related Art

In recent years, with the popularity of mobile products with camera functionalities, the demand for compact image capturing lens systems is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact image capturing lens systems have gradually evolved toward higher megapixels, there is an increasing demand for compact image capturing lens systems featuring better image quality.

A conventional compact image capturing lens system in a portable electronic product typically utilizes a three-element lens structure. Such a conventional image capturing lens system has a first lens element with positive refractive power, a second lens element with negative refractive power and a third lens element with positive refractive power. The first, second and third lens elements are arranged in this order from an object-side to an image-side. While the three-element lens structure is compact, it is not able to produce high quality images.

Another conventional compact image capturing lens system provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated. Moreover, it is not easy to attach the glass lenses, and thus the manufacturing process for forming the glass doublet lenses is difficult.

SUMMARY

According to one aspect of the present disclosure, an image capturing lens system includes, in order from an object side to an image side, a first lens element, a second lens element, a third lens element and a fourth lens element. The first lens element with negative refractive power has a convex object-side surface and a concave image-side surface. The second lens element with positive refractive power has a concave object-side surface and a convex image-side surface. The third lens element with negative refractive power is made of plastic material, and has a concave image-side surface, wherein an object-side surface and the image-side surface of the third lens element are aspheric. The fourth lens element with positive refractive power is made of plastic material, wherein an object-side surface and an image-side surface of the fourth lens element are aspheric. The image capturing lens system further includes a stop between the first lens element and the second lens element, wherein a focal length of the image capturing lens system is f, a curvature radius of the image-side surface of the third lens element is R6, and a curvature radius of the object-side surface of the fourth lens element is R7, the following relationship is satisfied:

$$0.1<|R6-R7|/f.$$

According to another aspect of the present disclosure, an image capturing lens system includes four non-cemented lens elements, in order from an object side to an image side, a first lens element, a second lens element, a third lens element and a fourth lens element. The first lens element with negative refractive power has a concave image-side surface. The second lens element with positive refractive power has a concave object-side surface and a convex image-side surface. The third lens element with negative refractive power is made of plastic material, and has a concave image-side surface, wherein an object-side surface and the image-side surface of the third lens element are aspheric. The fourth lens element with positive refractive power is made of plastic material, wherein an object-side surface and an image-side surface of the fourth lens element are aspheric, and the fourth lens element has at least one inflection point formed on at least one of the object-side surface and the image-side surface thereof. The image capturing lens system further includes an image sensor located on an image plane, wherein a maximum image height of the image capturing lens system is ImgH, and a vertical distance between the inflection point formed on the image-side surface of the fourth lens element and an optical axis is Yz, the following relationship is satisfied:

$$0.4<Yz/ImgH<1.0.$$

According to another aspect of the present disclosure, an image capturing lens system includes four non-cemented lens elements, in order from an object side to an image side, a first lens element, a second lens element, a third lens element and a fourth lens element. The first lens element with negative refractive power has a concave image-side surface. The second lens element with positive refractive power has a concave object-side surface and a convex image-side surface. The third lens element with negative refractive power is made of plastic material, and has a concave image-side surface, wherein an object-side surface and the image-side surface of the third lens element are aspheric. The fourth lens element with positive refractive power is made of plastic material, and has a convex image-side surface, wherein an object-side surface and the image-side surface of the fourth lens element are aspheric. The refractive index of the third lens element is N3, the Abbe number of the second lens element is V2, and the Abbe number of the third lens element is V3, the following relationships are satisfied:

$$N3<1.8; \text{ and}$$

$$25<V2-V3<45.$$

DETAILED DESCRIPTION

Figure 1:
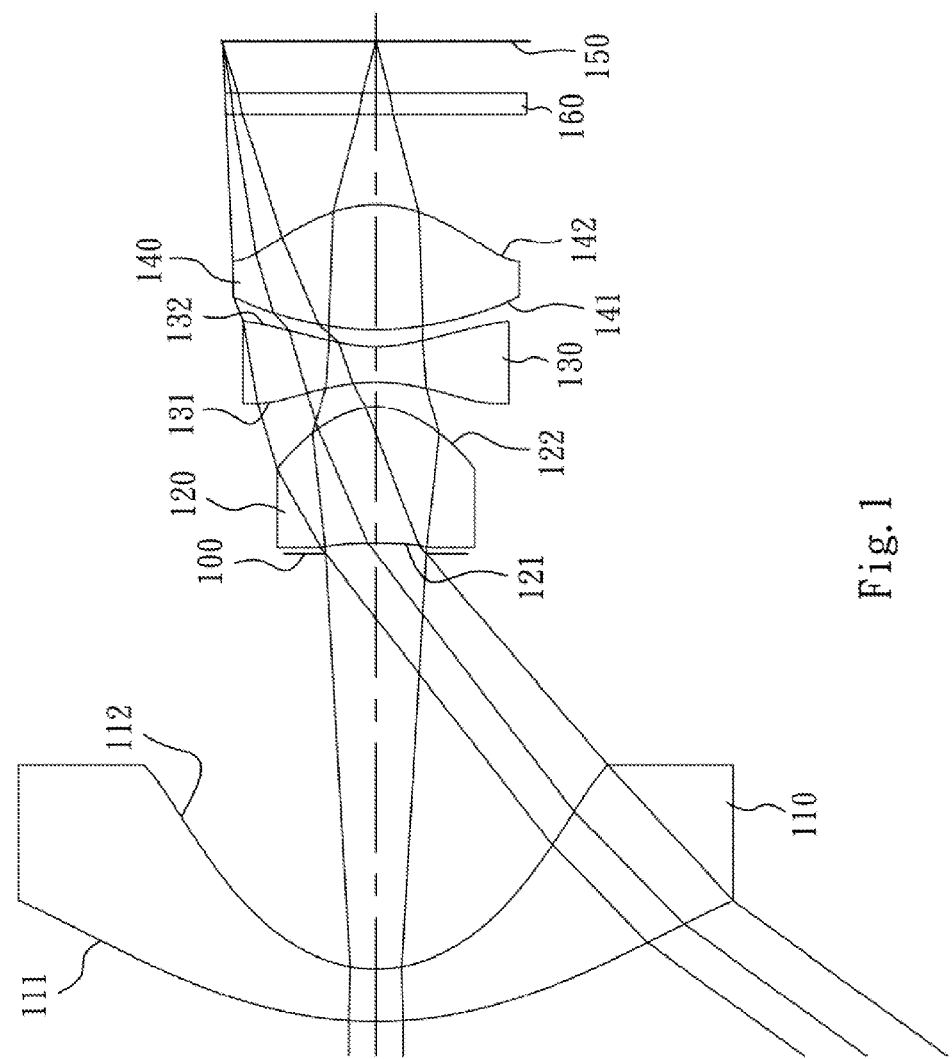
FIG. 1 is a schematic view of an image capturing lens system according to the first lens embodiment of the present disclosure.

An image capturing lens system includes, in order from an object side to an image side, a first lens element, a second lens element, a third lens element and a fourth lens element. From the first lens element to the fourth lens element are four non-cemented lens elements. That is, any two lens elements adjacent to each other are not cemented, and there is an air space between the two lens elements. The manufacture of the cemented lenses is more complex than the manufacture of the non-cemented lenses. Especially, the cemented surfaces of the two lens elements should have accurate curvatures for ensuring the connection between the two lens elements, and the displacement between the cemented surfaces of the two lens elements during cementing the lens elements may affect the optical quality of the image capturing lens system. Therefore, the image capturing lens system of the present disclosure provides fourth non-cemented lens elements for improving the problem generated by the cemented lens elements.

The first lens element has negative refractive power, so that the image capturing lens system can achieve wider view angle. The first lens element has a concave image-side surface, and a concave object-side surface or a convex image-side surface. Therefore, the view angle of the first lens element can be properly adjusted.

The second lens element with positive refractive power provides main positive refractive power for reducing the total track length of the image capturing lens system so as to maintain the compact size thereof. The second lens element has a concave object-side surface and a convex image-side surface, so that the astigmatism of the image capturing lens system can be corrected.

The third lens element with negative refractive power has a concave image-side surface, so that the third lens element can correct the aberration generated from the second lens element with positive refractive power.

The fourth lens element with positive refractive power provides a distribution of the refractive power of the image capturing lens system, so that the photosensitivity of the image capturing lens system can be reduced. The fourth lens element has a convex image-side surface for enhancing positive refractive power thereof and further reducing the total track length of the image capturing lens system. Moreover, the fourth lens element has at least one inflection point formed on at least one of the object-side surface and the image-side surface thereof. By the arrangement of the inflection point, the incident angle of the off-axis light on the image sensor can be effectively minimized and the aberration of the off-axis field can be corrected.

When a focal length of the image capturing lens system is f, a curvature radius of the image-side surface of the third lens element is R6, and a curvature radius of the object-side surface of the fourth lens element is R7, the following relationship is satisfied:

$$0.1 < |R6 - R7|/f.$$

Therefore, the aberration of the image capturing lens system can be corrected by the curvature of the image-side surface of the third lens element and the curvature of the object-side surface of the fourth lens element.

R6, R7 and f can further satisfy the following relationship:

$$0.5 < |R6 - R7|/f.$$

The image capturing lens system further includes a stop, such as an aperture stop, which can be positioned between the first lens element and the second lens element, when an axial distance between the stop and the image-side surface of the fourth lens element is SD, and an axial distance between the object-side surface of the first lens element and the image-side surface of the fourth lens element is TD, the following relationship is satisfied:

$$0.3 < SD/TD < 0.8.$$

Therefore, the image capturing lens system has a favorable balance between the telecentric and wide-angle characteristics, and a desirable total track length of the image capturing lens system can be maintained.

When the Abbe number of the second lens element is V2, and the Abbe number of the third lens element is V3, the following relationship is satisfied:

$$25 < V2 - V3 < 45.$$

Therefore, the chromatic aberration of the image capturing lens system can be corrected.

When a focal length of the second lens element is f2, and a focal length of the fourth lens element is f4, the following relationship is satisfied:

$$0.4 < f2/f4 < 1.0.$$

Therefore, the refractive power of the second lens element is proper, so that the aberration can be controlled and the photosensitivity can be reduced.

When a curvature radius of the image-side surface of the second lens element is R4, and a central thickness of the second lens element is CT2, the following relationship is satisfied:

$$-1.3 < R4/CT2 < -0.2$$

Therefore, the curvature of the image-side surface of the second lens element can further correct the astigmatism of the image capturing lens system, and the central thickness of the second lens element is advantageous for manufacture thereof.

When an axial distance between the second lens element and the third lens element is T23, and an axial distance between the third lens element and the fourth lens element is T34, the following relationship is satisfied:

$$0.2 < T34/T23 < 5.0.$$

Therefore, the fabrication of the lens elements is more easily realized by the proper spacing between the lens elements for enhancing the yield of the image capturing lens system.

When the focal length of the image capturing lens system is f, a focal length of the third lens element is f3, and a focal length of the fourth lens element is f4, the following relationship is satisfied:

$$-1.5 < (f/f3)+(f/f4) < -0.2.$$

Therefore, the image capturing lens system can reduce the back focal length to even shorten the total track length of the image capturing lens system.

When the refractive index of the third lens element is N3, the following relationship is satisfied:

$$N3 < 1.8.$$

Therefore, the refractive index of the third lens element would not be too large for reducing the aberration thereof.

When the focal length of the image capturing lens system is f, a focal length of the first lens element is f1, and a focal length of the second lens element is f2, the following relationship is satisfied:

$$0.5 < (f/f1)+(f/f2) < 1.3.$$

Therefore, the refractive power of the first lens element and the second lens element are advantageous for the wide field of view and the reduction of the total track length of the image capturing lens system.

The image capturing lens system further includes an image sensor (not shown in drawing) located on an image plane. When a maximum image height of the image capturing lens system is ImgH, which is a half of the diagonal length of the effective photosensitive area of the image sensor, and a vertical distance between the inflection point formed on the image-side surface of the fourth lens element and an optical axis is Yz, the following relationship is satisfied:

$$0.4 < Yz/ImgH < 1.0.$$

Therefore, the incident angle of the off-axis light on the image sensor can in be effectively minimized and the aberration of the off-axis field can be corrected.

According to the image capturing lens system of the present disclosure, the lens element can be made of glass material or plastic material. When the lens element is made of glass material, there is a higher degree of freedom in setting the parameters in distributing the refractive power of the image capturing lens system. When the lens element is made of plastic material, the cost of manufacture can be effectively reduced. Moreover, the surface of the lens element can be aspheric, so that it is easier to make the surface into other non-spherical shapes. As a result, more controllable variables are obtained, while reducing the aberration and the number of required lens elements. Therefore, the total track length of the image capturing lens system can also be reduced.

According to the image capturing lens system of the present disclosure, when the lens element has a convex surface, it indicates that the paraxial region of the surface is convex, and when the lens element has a concave surface, it indicates that the paraxial region of the surface is concave.

According to the image capturing lens system of the present disclosure, the image capturing lens system can include at least one stop for reducing stray light or other functionalities. Furthermore, when the stop is an aperture stop, the position of the aperture stop can be arbitrarily placed in front of the entire optical system or within the optical system according to the preference of the designer, in order to achieve the desirable optical features or higher image quality produced from the optical system.

According to the above description of the present disclosure, the following 1st-9th specific embodiments are provided for further explanation.

Figure 2:
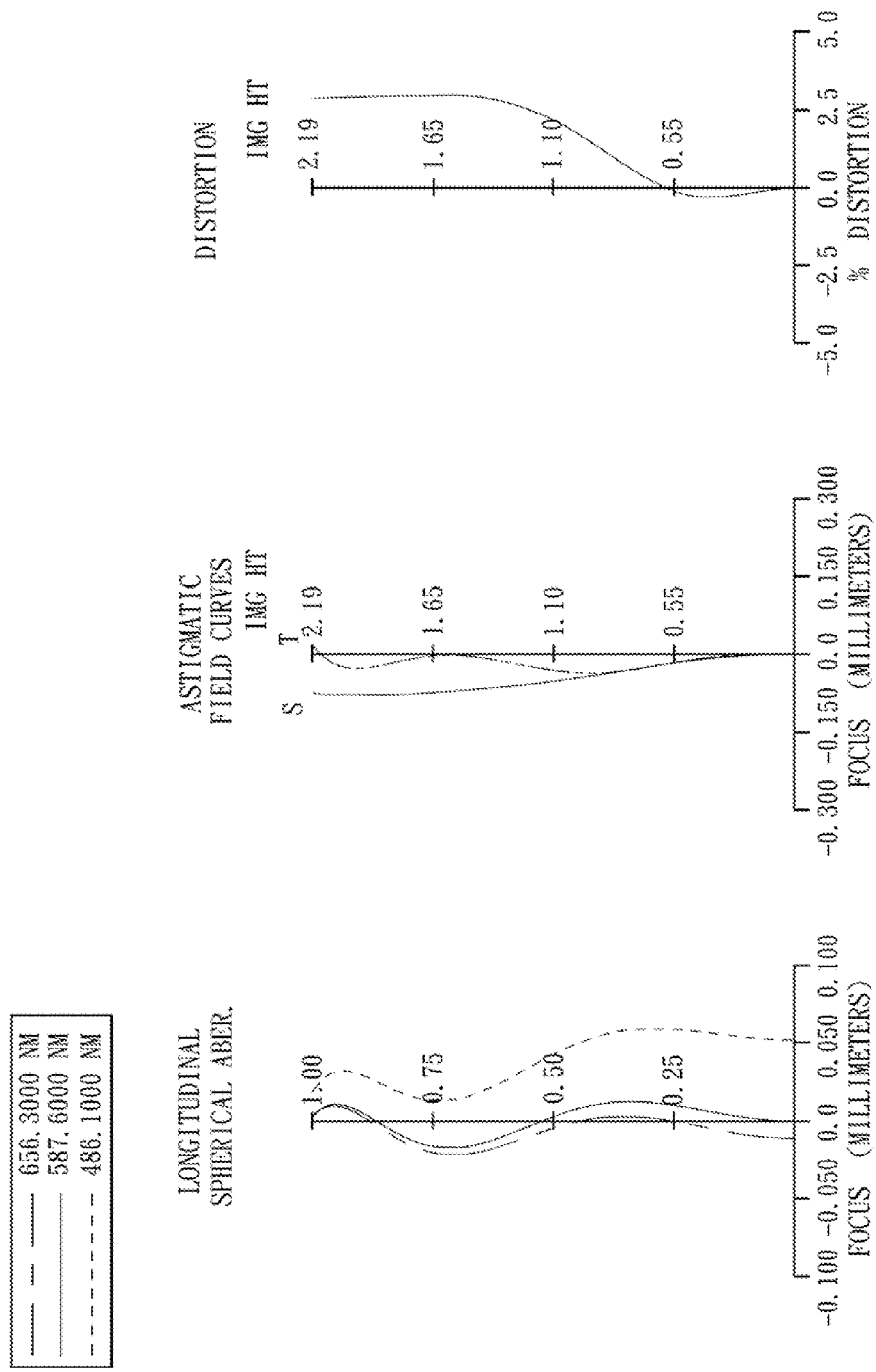
FIG. 2 shows spherical aberration curves, astigmatic field curves and a distortion curve of the image capturing lens system according to the first embodiment.

FIG. 1 is a schematic view of an image capturing lens system according to the first lens embodiment of the present disclosure. FIG. 2 shows spherical aberration curves, astigmatic field curves and a distortion curve of the image capturing lens system according to the first embodiment. In FIG. 1, the image capturing lens system includes, in order from an object side to an image side, the first lens element 110, an aperture stop 100, the second lens element 120, the third lens element 130, the fourth lens element 140, an IR (infrared) cut filter 160 and an image plane 150.

The first lens element 110 with negative refractive power has a convex object-side surface 111 and a concave image-side surface 112, and is made of plastic material. The object-side surface 111 and the image-side surface 112 of the first lens element 110 are aspheric.

The second lens element 120 with positive refractive power has a concave object-side surface 121 and a convex image-side surface 122, and is made of plastic material. The object-side surface 121 and the image-side surface 122 of the second lens element 120 are aspheric.

The third lens element 130 with negative refractive power has a concave object-side surface 131 and a concave image-side surface 132, and is made of plastic material. The object-side surface 131 and the image-side surface 132 of the third lens element 130 are aspheric.

The fourth lens element 140 with positive refractive power has a convex object-side surface 141 and a convex image-side surface 142, and is made of plastic material. The object-side surface 141 and the image-side surface 142 of the fourth lens element 140 are aspheric. Furthermore, the fourth lens element 140 has inflection points formed on the image-side surface 142 thereof.

The IR cut filter 160 is located between the fourth lens element 140 and the image plane 150, and will not affect the focal length of the image capturing lens system.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

where:

X is the height of a point on the aspheric surface spaced at a distance Y from the optical axis relative to the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the image capturing lens system according to the first embodiment, when a focal length of the image capturing lens system is f, an f-number of the image capturing lens system is Fno, and a half of the maximal field of view is HFOV, these parameters have the following values:

f=1.55 mm;

Fno=2.00; and

HFOV=54.0 degrees.

In the image capturing lens system according to the first embodiment, when the Abbe number of the second lens element 120 is V2, and the Abbe number of the third lens element 130 is V3, the following relationship is satisfied:

$V2-V3=35.1$.

In the image capturing lens system according to the first embodiment, when the refractive index of the third lens element 130 is N3, the following relationship is satisfied:

$N3=1.650$.

In the image capturing lens system according to the first embodiment, when an axial distance between the second lens element 120 and the third lens element 130 is T23, and an axial distance between the third lens element 130 and the fourth lens element 140 is T34, the following relationship is satisfied:

$T34/T23=0.70$.

In the image capturing lens system according to the first embodiment, when a curvature radius of the image-side surface 122 of the second lens element 120 is R4, and a central thickness of the second lens element 120 is CT2, the following relationship is satisfied:

$R4/CT2=-0.47$.

In the image capturing lens system according to the first embodiment, when the focal length of the image capturing lens system is f, the curvature radius of the image-side surface 132 of the third lens element 130 is R6, and the curvature radius of the object-side surface 141 of the fourth lens element 140 is R7, the following relationship is satisfied:

$|R6-R7|/f=1.50$.

In the image capturing lens system according to the first embodiment, when the focal length of the image capturing lens system is f, a focal length of the first lens element 110 is f1, a focal length of the second lens element 120 is f2, a focal length of the third lens element 130 is f3, and a focal length of the fourth lens element 140 is f4, the following relationships are satisfied:

$f2/f4=0.69$;

$(f/f1)+(f/f2)=0.65$; and $(f/f3)+(f/f4)=-0.36$.

In the image capturing lens system according to the first embodiment, when an axial distance between the stop and the image-side surface of the fourth lens element is SD, and an axial distance between the object-side surface of the first lens element and the image-side surface of the fourth lens element is TD, the following relationship is satisfied:

$SD/TD=0.43$.

Figure 19:
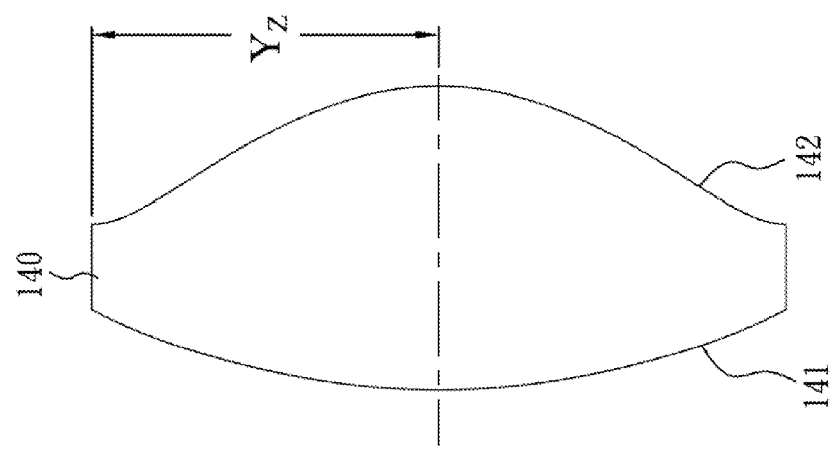
FIG. 19 is a schematic view of the fourth lens element according to the first embodiment.

FIG. 19 is a schematic view of the fourth lens element according to the first embodiment. In FIG. 19, the image capturing lens system further includes an image sensor located on an image plane 150, when a maximum image height of the image capturing lens system is ImgH, and a vertical distance between the inflection point formed on the image-side surface 142 of the fourth lens element 140 and an optical axis is Yz, the following relationship is satisfied:

$Yz/ImgH=0.67$.

The detailed optical data of the first embodiment are shown in Table 1 and the aspheric surface data are shown in Table 2 below.

TABLE 1

1st Embodiment
f = 1.55 mm, Fno = 2.00, HFOV = 54.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 6.076200 (ASP) | 0.759 | Plastic | 1.514 | 56.8 | −6.70 |
| 2 | | 2.103920 (ASP) | 5.963 | | | | |
| 3 | Ape. Stop | Plano | 0.150 | | | | |
| 4 | Lens 2 | −10.000000 (ASP) | 1.964 | Plastic | 1.543 | 56.5 | 1.76 |
| 5 | | −0.932120 (ASP) | 0.356 | | | | |
| 6 | Lens 3 | −2.368630 (ASP) | 0.500 | Plastic | 1.650 | 21.4 | −1.60 |
| 7 | | 2.000000 (ASP) | 0.250 | | | | |
| 8 | Lens 4 | 4.322400 (ASP) | 1.800 | Plastic | 1.543 | 56.5 | 2.55 |
| 9 | | −1.741180 (ASP) | 1.300 | | | | |
| 10 | IR-filter | Plano | 0.300 | Glass | 1.517 | 64.2 | — |
| 11 | | Plano | 0.742 | | | | |
| 12 | Image | Plano | — | | | | |

Reference wavelength (d-line) is 587.6 nm.

TABLE 2

Aspheric Coefficients

| Surface # | 1 | 2 | 4 | 5 |
|---|---|---|---|---|
| k = | −3.52591E−01 | −6.74486E−01 | 3.00000E+00 | −2.76830E+00 |
| A4 = | −2.25021E−04 | 5.19502E−03 | −1.10710E−01 | −8.17732E−02 |
| A6 = | −8.54015E−05 | −9.91951E−04 | 2.27026E−01 | 3.11266E−02 |
| A8 = | 3.45667E−06 | 9.05206E−05 | −5.18270E−01 | −1.80950E−02 |
| A10 = | −5.60312E−08 | −8.42389E−06 | 3.58628E−01 | 4.32710E−03 |

| Surface # | 6 | 7 | 8 | 9 |
|---|---|---|---|---|
| k = | −2.00000E+01 | −9.15329E+00 | −2.17998E+00 | −1.03946E+00 |
| A4 = | −2.96268E−02 | −9.87215E−03 | −1.88236E−03 | 1.50242E−02 |
| A6 = | 3.42145E−03 | 2.22056E−03 | 1.63832E−04 | −1.92394E−03 |
| A8 = | 4.23359E−03 | −5.69019E−04 | 1.04585E−04 | 6.55840E−04 |
| A10 = | −7.45529E−04 | 4.17867E−05 | 1.26680E−05 | 1.49573E−05 |
| A12 = | | | −1.64704E−06 | 5.08835E−06 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A12 represent the aspheric coefficients ranging from the 1st order to the 12th order. This information related to Table 1 and Table 2 applies also to the Tables for the remaining embodiments, and so an explanation in this regard will not be provided again.

Figure 3:
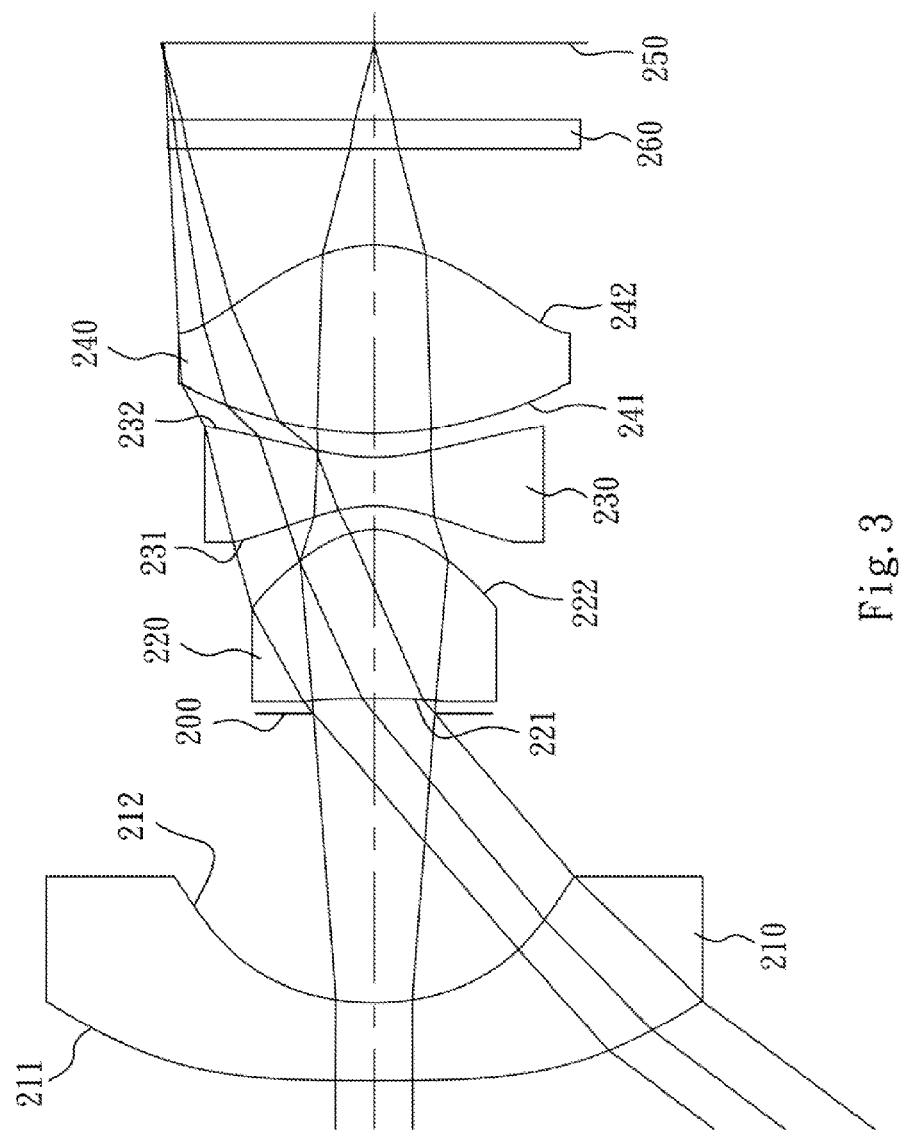
FIG. 3 is a schematic view of an image capturing lens system according to the second lens embodiment of the present disclosure.
Figure 4:
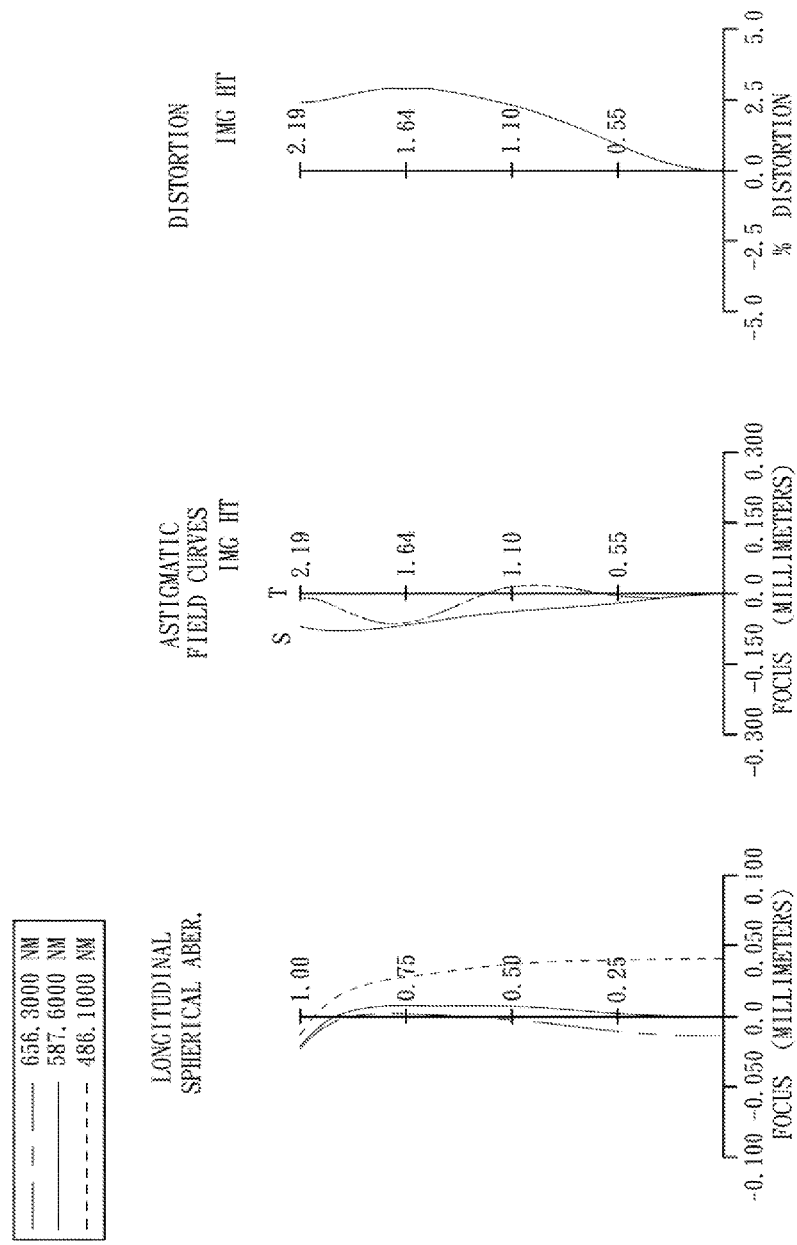
FIG. 4 shows spherical aberration curves, astigmatic field curves and a distortion curve of the image capturing lens system according to the second embodiment.

FIG. 3 is a schematic view of an image capturing lens system according to the second lens embodiment of the present disclosure. FIG. 4 shows spherical aberration curves, astigmatic field curves and a distortion curve of the image capturing lens system according to the second embodiment. In FIG. 3, the image capturing lens assembly includes, in order from an object side to an image side, the first lens element 210, an aperture stop 200, the second lens element 220, the third lens element 230, the fourth lens element 240, an IR cut filter 260 and an image plane 250.

The first lens element 210 with negative refractive power has a convex object-side surface 211 and a concave image-side surface 212, and is made of plastic material. The object-side surface 211 and the image-side surface 212 of the first lens element 210 are aspheric.

The second lens element 220 with positive refractive power has a concave object-side surface 221 and a convex image-side surface 222, and is made of plastic material. The object-side surface 221 and the image-side surface 222 of the second lens element 220 are aspheric.

The third lens element 230 with negative refractive power has a concave object-side surface 231 and a concave image-side surface 232, and is made of plastic material. The object-side surface 231 and the image-side surface 232 of the third lens element 230 are aspheric.

The fourth lens element 240 with positive refractive power has a convex object-side surface 241 and a convex image-side surface 242, and is made of plastic material. The object-side surface 241 and the image-side surface 242 of the fourth lens element 240 are aspheric. Furthermore, the fourth lens element 240 has inflection points formed on the image-side surface 242 thereof.

The IR cut filter 260 is located between the fourth lens element 240 and the image plane 250, and will not affect the focal length of the image capturing lens system.

The equation of the aspheric surface profiles of the above lens elements of the second embodiment is the same as that of the first embodiment, and will not be stated herein again.

The detailed optical data of the second embodiment are shown in Table 3 and the aspheric surface data are shown in Table 4 below.

TABLE 3

2nd Embodiment
f = 1.60 mm, Fno = 2.00, HFOV = 53.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 53.408800 (ASP) | 0.810 | Plastic | 1.535 | 56.3 | −5.20 |
| 2 | | 2.626530 (ASP) | 3.001 | | | | |
| 3 | Ape. Stop | Plano | 0.150 | | | | |
| 4 | Lens 2 | −88.495600 (ASP) | 1.759 | Plastic | 1.535 | 56.3 | 1.35 |
| 5 | | −0.719110 (ASP) | 0.245 | | | | |
| 6 | Lens 3 | −1.285930 (ASP) | 0.500 | Plastic | 1.634 | 23.8 | −1.17 |
| 7 | | 2.000000 (ASP) | 0.250 | | | | |
| 8 | Lens 4 | 3.678100 (ASP) | 1.955 | Plastic | 1.535 | 56.3 | 2.20 |
| 9 | | −1.406760 (ASP) | 1.000 | | | | |
| 10 | IR-filter | Plano | 0.300 | Glass | 1.517 | 64.2 | — |
| 11 | | Plano | 0.797 | | | | |
| 12 | Image | Plano | — | | | | |

Reference wavelength (d-line) is 587.6 nm.

TABLE 4

Aspheric Coefficients

| Surface # | 1 | 2 | 4 | 5 |
|---|---|---|---|---|
| k = | −1.00000E+00 | −3.23781E−01 | −1.00000E+00 | −2.76318E+00 |
| A4 = | 9.34284E−03 | 1.13114E−02 | −1.08142E−01 | −9.85588E−02 |
| A6 = | −3.02372E−04 | 2.24676E−03 | 1.32154E−01 | 4.12297E−02 |
| A8 = | −9.58490E−06 | 1.37541E−03 | −4.03721E−01 | −2.88901E−02 |
| A10 = | 5.27934E−07 | −3.27401E−04 | 3.89123E−01 | 8.25254E−03 |

| Surface # | 6 | 7 | 8 | 9 |
|---|---|---|---|---|
| k = | −9.93925E+00 | −1.09143E+01 | −2.99545E+00 | −1.42583E+00 |
| A4 = | −3.39251E−02 | −9.94384E−03 | −1.15893E−03 | 1.31477E−02 |
| A6 = | 7.61049E−03 | 2.55485E−03 | 1.32106E−04 | −2.80051E−03 |
| A8 = | 6.44023E−03 | −6.49253E−04 | 2.02523E−04 | 9.94250E−04 |
| A10 = | −1.55617E−03 | 3.61939E−05 | −5.19147E−06 | |

In the image capturing lens system according to the second embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the second embodiment. Moreover, these parameters can be calculated from Table 3 as the following values and satisfy the following relationships:

| f (mm) | 1.60 | |R6 − R7|/f | 1.05 |
|---|---|---|---|
| Fno | 2.00 | f2/f4 | 0.61 |
| HFOV (deg.) | 53.4 | (f/f1) + (f/f2) | 0.88 |
| V2 − V3 | 32.5 | (f/f3) + (f/f4) | −0.64 |
| N3 | 1.634 | SD/TD | 0.56 |
| T34/T23 | 1.02 | Yz/ImgH | 0.64 |
| R4/CT2 | −0.41 | | |

Figure 5:
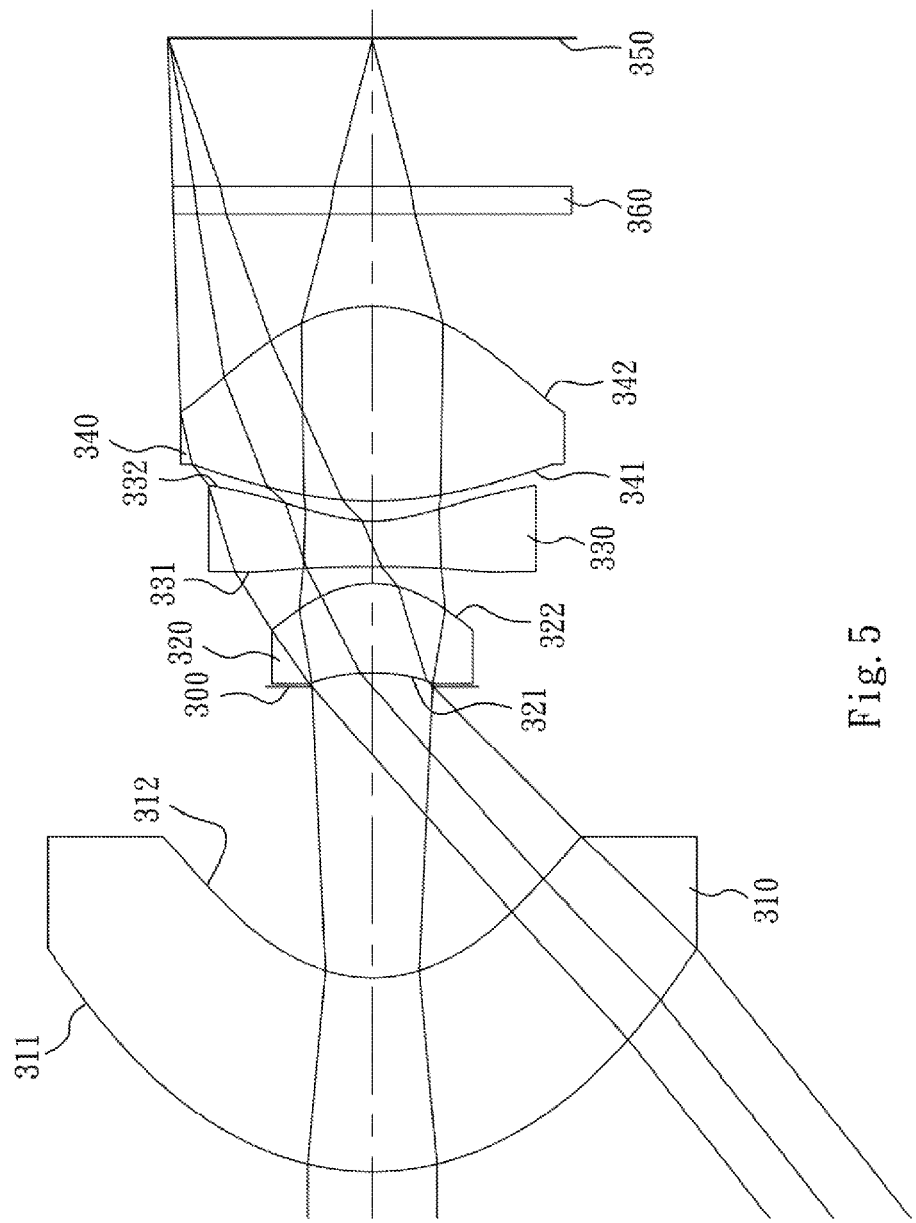
FIG. 5 is a schematic view of an image capturing lens system according to the third lens embodiment of the present disclosure.
Figure 6:
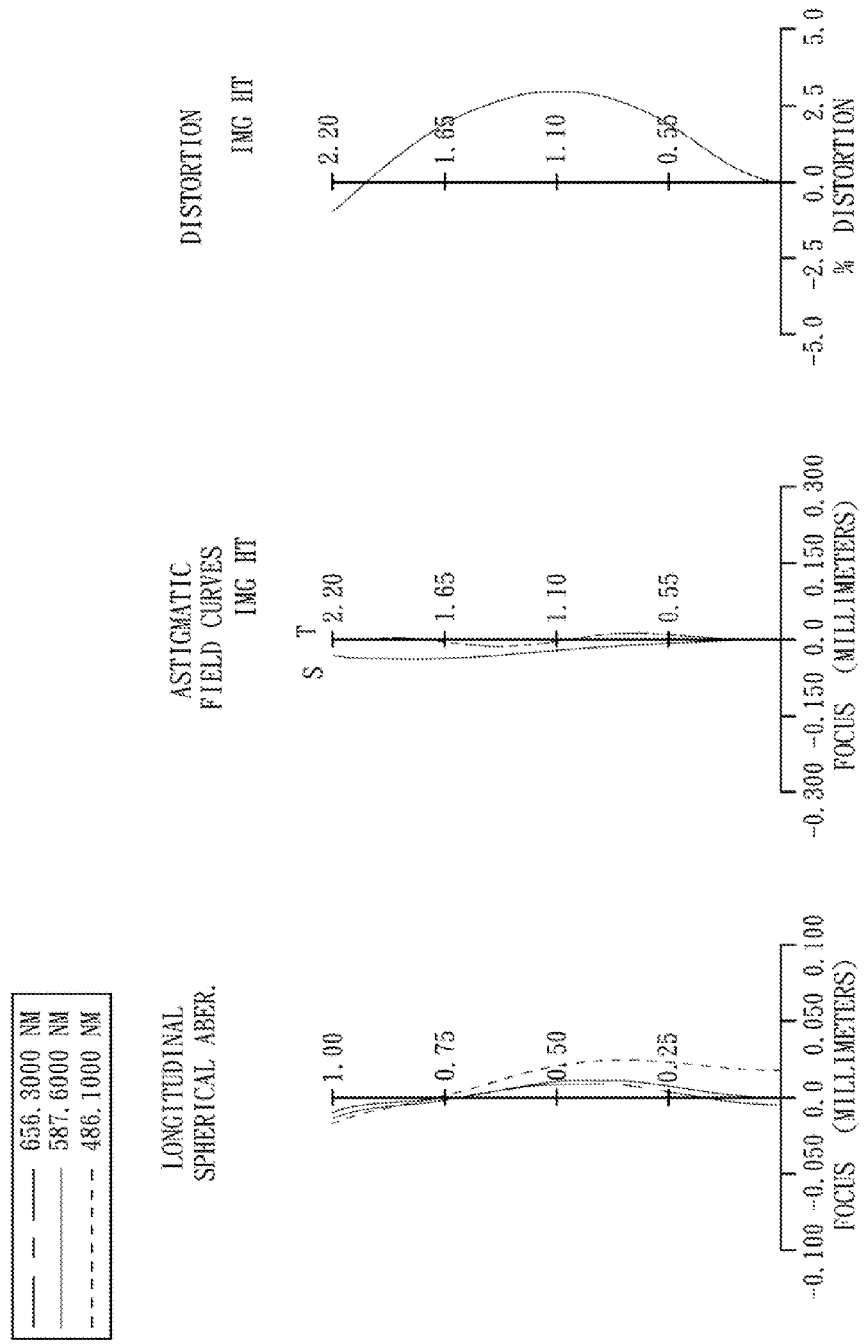
FIG. 6 shows spherical aberration curves, astigmatic field curves and a distortion curve of the image capturing lens system according to the third embodiment.

FIG. 5 is a schematic view of an image capturing lens system according to the third lens embodiment of the present disclosure. FIG. 6 shows spherical aberration curves, astigmatic field curves and a distortion curve of the image capturing lens system according to the third embodiment. In FIG. 5, the image capturing lens assembly includes, in order from an object side to an image side, the first lens element 310, an aperture stop 300, the second lens element 320, the third lens element 330, the fourth lens element 340, an IR cut filter 360 and an image plane 350.

The first lens element 310 with negative refractive power has a convex object-side surface 311 and a concave image-side surface 312, and is made of plastic material. The object-side surface 311 and the image-side surface 312 of the first lens element 310 are aspheric.

The second lens element 320 with positive refractive power has a concave object-side surface 321 and a convex image-side surface 322, and is made of plastic material. The object-side surface 321 and the image-side surface 322 of the second lens element 320 are aspheric.

The third lens element 330 with negative refractive power has a concave object-side surface 331 and a concave image-side surface 332, and is made of plastic material. The object-side surface 331 and the concave image-side surface 332 of the third lens element 330 are aspheric.

The fourth lens element 340 with positive refractive power has a convex object-side surface 341 and a convex image-side surface 342, and is made of plastic material. The object-side surface 341 and the image-side surface 342 of the fourth lens element 340 are aspheric. Furthermore, the fourth lens element 340 has inflection points formed on the image-side surface 342 thereof.

The IR cut filter 360 is located between the fourth lens element 340 and the image plane 350, and will not affect the focal length of the image capturing lens system.

The equation of the aspheric surface profiles of the above lens elements of the third embodiment is the same as that of the first embodiment, and will not be stated herein again.

The detailed optical data of the third embodiment are shown in Table 5 and the aspheric surface data are shown in Table 6 below.

TABLE 5

3rd Embodiment
f = 2.80 mm, Fno = 2.00, HFOV = 38.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.989370 (ASP) | 2.100 | Plastic | 1.634 | 23.8 | −14.52 |
| 2 | | 1.641470 (ASP) | 3.153 | | | | |
| 3 | Ape. Stop | Plano | 0.150 | | | | |
| 4 | Lens 2 | −2.355730 (ASP) | 0.971 | Plastic | 1.544 | 55.9 | 2.60 |
| 5 | | −1.011660 (ASP) | 0.179 | | | | |
| 6 | Lens 3 | −22.448500 (ASP) | 0.500 | Plastic | 1.634 | 23.8 | −2.19 |
| 7 | | 1.494810 (ASP) | 0.212 | | | | |
| 8 | Lens 4 | 3.978300 (ASP) | 2.110 | Plastic | 1.544 | 55.9 | 2.39 |
| 9 | | −1.575090 (ASP) | 1.000 | | | | |

TABLE 5-continued

3rd Embodiment
f = 2.80 mm, Fno = 2.00, HFOV = 38.4 deg.

| Surface # | | Curvature Radius | Thickness | Material | Index | Abbe # | Focal length |
|---|---|---|---|---|---|---|---|
| 10 | IR-filter | Plano | 0.300 | Glass | 1.517 | 64.2 | — |
| 11 | | Plano | 1.609 | | | | |
| 12 | Image | Plano | — | | | | |

Reference wavelength (d-line) is 587.6 nm.

TABLE 6

Aspheric Coefficients

| | Surface # | | | |
|---|---|---|---|---|
| | 1 | 2 | 4 | 5 |
| k = | −7.35887E−01 | −6.12549E−01 | 1.24526E+00 | −3.39871E+00 |
| A4 = | 2.24372E−03 | 6.34022E−04 | −9.15033E−02 | −1.24604E−01 |
| A6 = | −2.07802E−04 | −5.75554E−03 | 1.32150E−01 | 6.82073E−02 |
| A8 = | 1.11479E−05 | 9.53804E−04 | −3.36621E−01 | −4.98890E−02 |
| A10 = | −2.80310E−07 | −1.21580E−04 | 2.73675E−01 | 2.24979E−02 |

| | Surface # | | | |
|---|---|---|---|---|
| | 6 | 7 | 8 | 9 |
| k = | 1.10877E+01 | −7.91380E+00 | −1.57472E+00 | −8.06301E−01 |
| A4 = | −2.46842E−02 | −1.66611E−02 | −4.27020E−03 | 1.70468E−02 |
| A6 = | 5.27032E−03 | 3.53657E−03 | −9.94687E−04 | −3.06151E−03 |
| A8 = | 4.69719E−03 | −1.10088E−03 | 2.62537E−04 | 8.39128E−04 |
| A10 = | −9.97326E−04 | 1.75648E−04 | −1.57383E−06 | |

In the image capturing lens system according to the third embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the third embodiment. Moreover, these parameters can be calculated from Table 5 as the following values and satisfy the following relationships:

| f (mm) | 2.80 | |R6 − R7|/f | 0.89 |
|---|---|---|---|
| Fno | 2.00 | f2/f4 | 1.08 |
| HFOV (deg.) | 38.4 | (f/f1) + (f/f2) | 0.89 |
| V2 − V3 | 32.1 | (f/f3) + (f/f4) | −0.11 |
| N3 | 1.634 | SD/TD | 0.44 |
| T34/T23 | 1.18 | Yz/ImgH | 0.77 |
| R4/CT2 | −1.04 | | |

Figure 7:
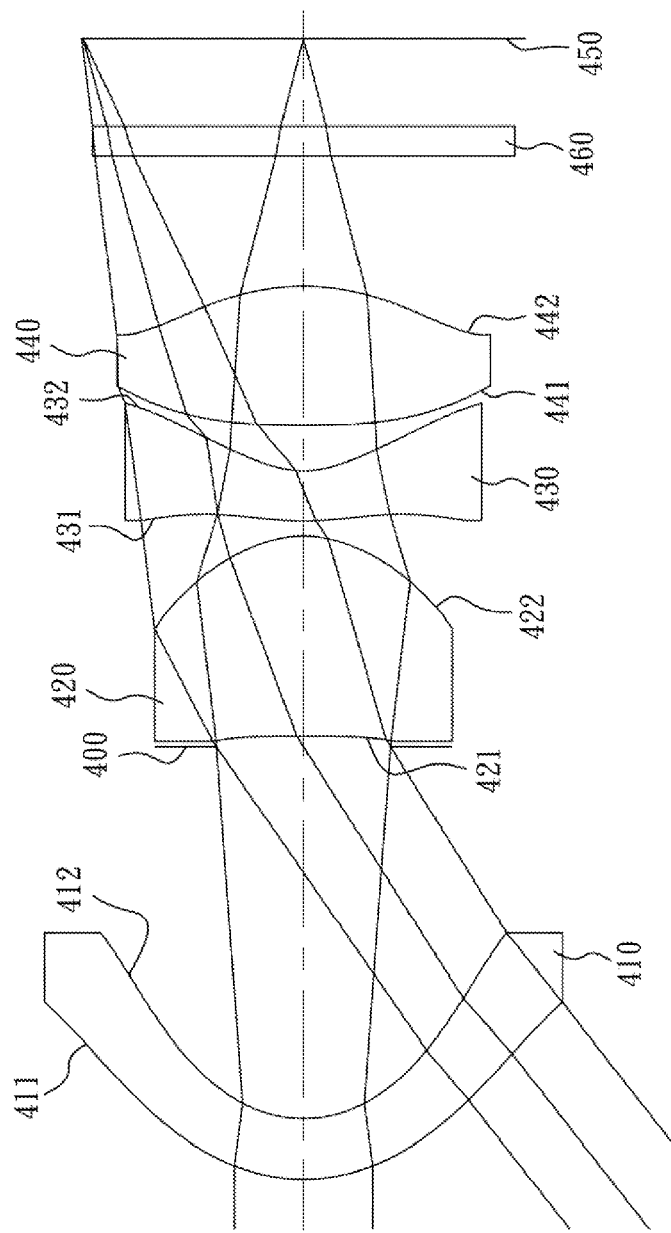
FIG. 7 is a schematic view of an image capturing lens system according to the fourth lens embodiment of the present disclosure.
Figure 8:
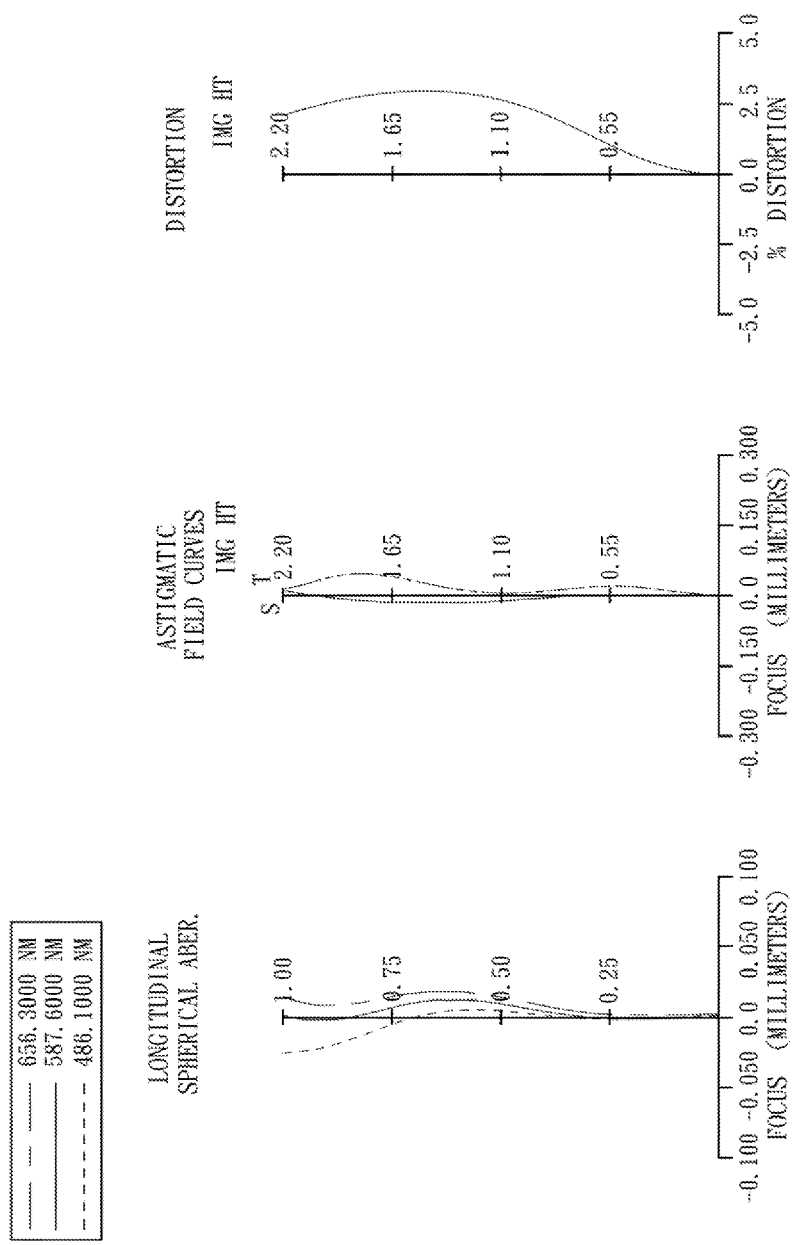
FIG. 8 shows spherical aberration curves, astigmatic field curves and a distortion curve of the image capturing lens system according to the fourth embodiment.

FIG. 7 is a schematic view of an image capturing lens system according to the fourth lens embodiment of the present disclosure. FIG. 8 shows spherical aberration curves, astigmatic field curves and a distortion curve of the image capturing lens system according to the fourth embodiment. In FIG. 7, the image capturing lens system includes, in order from an object side to an image side, the first lens element 410, an aperture stop 400, the second lens element 420, the third lens element 430, the fourth lens element 440, an IR cut filter 460 and an image plane 450.

The first lens element 410 with negative refractive power has a convex object-side surface 411 and a concave image-side surface 412, and is made of plastic material. The object-side surface 411 and the image-side surface 412 of the first lens element 410 are aspheric.

The second lens element 420 with positive refractive power has a concave object-side surface 421 and a convex image-side surface 422, and is made of plastic material. The object-side surface 421 and the image-side surface 422 of the second lens element 420 are aspheric.

The third lens element 430 with negative refractive power has a convex object-side surface 431 and a concave image-side surface 432, and is made of plastic material. The object-side surface 431 and the image-side surface 432 of the third lens element 430 are aspheric.

The fourth lens element 440 with positive refractive power has a convex object-side surface 441 and a convex image-side surface 442, and is made of plastic material. The object-side surface 441 and the image-side surface 442 of the fourth lens element 440 are aspheric. Furthermore, the fourth lens element 440 has inflection points formed on the image-side surface 442 thereof.

The IR cut filter 460 is located between the fourth lens element 440 and the image plane 450, and will not affect the focal length of the image capturing lens system.

The equation of the aspheric surface profiles of the above lens elements of the fourth embodiment is the same as that of the first embodiment, and will not be stated herein again.

The detailed optical data of the fourth embodiment are shown in Table 7 and the aspheric surface data are shown in Table 8 below.

TABLE 7

4th Embodiment
f = 2.76 mm, Fno = 2.00, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.840750 (ASP) | 0.600 | Plastic | 1.530 | 55.8 | −10.36 |
| 2 | | 1.222860 (ASP) | 3.712 | | | | |
| 3 | Ape. Stop | Plano | 0.103 | | | | |
| 4 | Lens 2 | −44.752700 (ASP) | 2.000 | Plastic | 1.530 | 55.8 | 2.09 |
| 5 | | −1.097900 (ASP) | 0.150 | | | | |
| 6 | Lens 3 | 3.125000 (ASP) | 0.500 | Plastic | 1.614 | 25.6 | −2.38 |
| 7 | | 0.935440 (ASP) | 0.457 | | | | |
| 8 | Lens 4 | 16.385200 (ASP) | 1.386 | Plastic | 1.530 | 55.8 | 3.82 |
| 9 | | −2.240880 (ASP) | 1.300 | | | | |
| 10 | IR-filter | Plano | 0.300 | Glass | 1.517 | 64.2 | — |
| 11 | | Plano | 0.876 | | | | |
| 12 | Image | Plano | — | | | | |

Reference wavelength (d-line) is 587.6 nm.

TABLE 8

Aspheric Coefficients

| | Surface # | | | |
|---|---|---|---|---|
| | 1 | 2 | 4 | 5 |
| k = | −8.67294E−01 | −7.19123E−01 | 3.00000E+00 | −3.44933E+00 |
| A4 = | 1.00054E−02 | 1.98156E−02 | −3.55734E−02 | −7.42926E−02 |
| A6 = | −1.63376E−03 | −7.51264E−03 | −3.12025E−02 | 5.92692E−03 |
| A8 = | −1.40452E−04 | 7.86033E−04 | 1.54325E−02 | 2.19420E−03 |
| A10 = | 1.00929E−05 | −3.85019E−04 | −1.69380E−02 | −1.59713E−03 |

| | Surface # | | | |
|---|---|---|---|---|
| | 6 | 7 | 8 | 9 |
| k = | −1.00000E+00 | −3.41183E+00 | 3.00000E+00 | −6.03100E−01 |
| A4 = | −1.16806E−01 | −2.24934E−02 | 4.39350E−02 | 1.96186E−02 |
| A6 = | 2.37448E−02 | 4.80846E−03 | −6.24335E−03 | −1.90981E−03 |
| A8 = | 3.43034E−04 | −2.28082E−04 | −3.22931E−04 | 1.39267E−03 |
| A10 = | −4.59413E−04 | −1.52238E−04 | 1.29709E−04 | |

In the image capturing lens system according to the fourth embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the fourth embodiment. Moreover, these parameters can be calculated from Table 7 as the following values and satisfy the following relationships:

| f (mm) | 2.76 | |R6 − R7|/f | 5.60 |
|---|---|---|---|
| Fno | 2.00 | f2/f4 | 0.55 |
| HFOV (deg.) | 38.0 | (f/f1) + (f/f2) | 1.05 |
| V2 − V3 | 30.2 | (f/f3) + (f/f4) | −0.44 |
| N3 | 1.614 | SD/TD | 0.52 |
| T34/T23 | 3.05 | Yz/ImgH | 0.58 |
| R4/CT2 | −0.55 | | |

Figure 9:
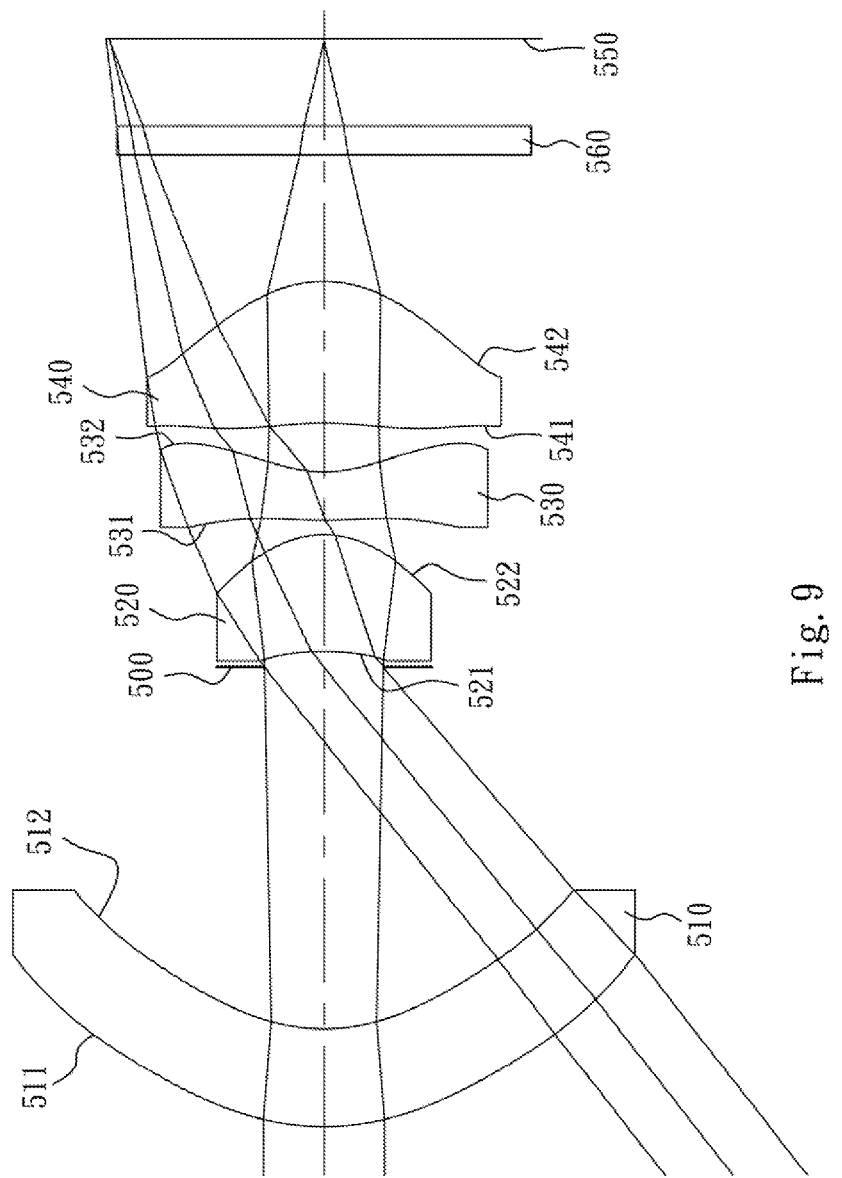
FIG. 9 is a schematic view of an image capturing lens system according to the fifth lens embodiment of the present disclosure.
Figure 10:
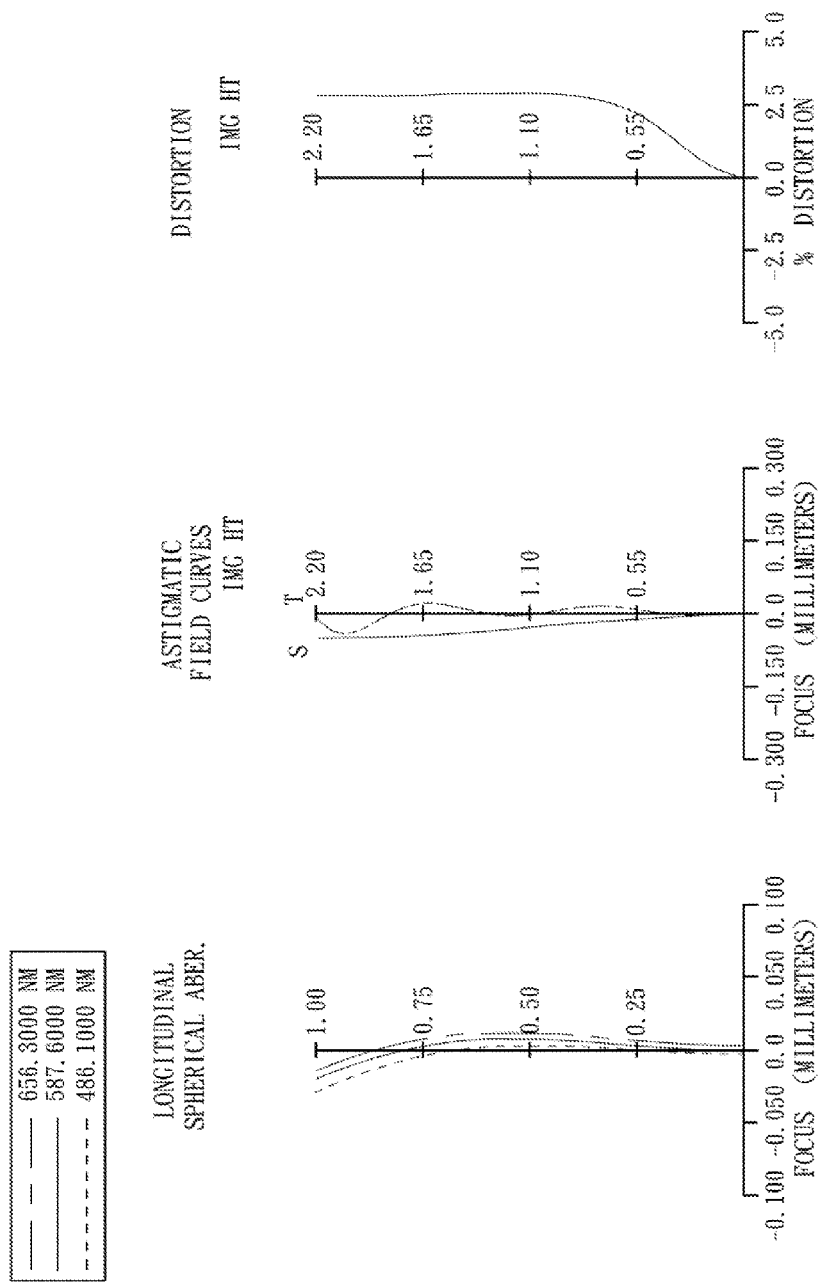
FIG. 10 shows spherical aberration curves, astigmatic field curves and a distortion curve of the image capturing lens system according to the fifth embodiment.

FIG. 9 is a schematic view of an image capturing lens system according to the fifth lens embodiment of the present disclosure. FIG. 10 shows spherical aberration curves, astigmatic field curves and a distortion curve of the image capturing lens system according to the fifth embodiment. In FIG. 9, the image capturing lens system includes, in order from an object side to an image side, the first lens element 510, an aperture stop 500, the second lens element 520, the third lens element 530, the fourth lens element 540, an IR cut filter 560 and an image plane 550.

The first lens element 510 with negative refractive power has a convex object-side surface 511 and a concave image-side surface 512, and is made of plastic material. The object-side surface 511 and the image-side surface 512 of the first lens element 510 are aspheric.

The second lens element 520 with positive refractive power has a concave object-side surface 521 and a convex image-side surface 522, and is made of plastic material. The object-side surface 521 and the image-side surface 522 of the second lens element 520 are aspheric.

The third lens element 530 with negative refractive power has a convex object-side surface 531 and a concave image-side surface 532, and is made of plastic material. The object-side surface 531 and the image-side surface 532 of the third lens element 530 are aspheric.

The fourth lens element 540 with positive refractive power has a concave object-side surface 541 and a convex image-side surface 542, and is made of plastic material. The object-side surface 541 and the image-side surface 542 of the fourth lens element 540 are aspheric. Furthermore, the fourth lens element 540 has inflection points formed on the object-side surface 541 and the image-side surface 542 thereof.

The IR cut filter 560 is located between the fourth lens element 540 and the image plane 550, and will not affect the focal length of the image capturing lens system.

The equation of the aspheric surface profiles of the above lens elements of the fifth embodiment is the same as that of the first embodiment, and will not be stated herein again.

The detailed optical data of the fifth embodiment are shown in Table 9 and the aspheric surface data are shown in Table 10 below.

TABLE 9

5th Embodiment
f = 2.74 mm, Fno = 2.20, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.644450 (ASP) | 1.005 | Plastic | 1.530 | 55.8 | −29.82 |
| 2 | | 1.967150 (ASP) | 3.719 | | | | |
| 3 | Ape. Stop | Plano | 0.158 | | | | |
| 4 | Lens 2 | −2.817680 (ASP) | 1.200 | Plastic | 1.530 | 55.8 | 2.24 |
| 5 | | −0.957660 (ASP) | 0.150 | | | | |
| 6 | Lens 3 | 4.782600 (ASP) | 0.500 | Plastic | 1.633 | 23.4 | −3.01 |
| 7 | | 1.308320 (ASP) | 0.496 | | | | |
| 8 | Lens 4 | −3.703700 (ASP) | 1.456 | Plastic | 1.530 | 55.8 | 2.99 |
| 9 | | −1.260850 (ASP) | 1.300 | | | | |
| 10 | IR-filter | Plano | 0.300 | Glass | 1.517 | 64.2 | — |
| 11 | | Plano | 0.892 | | | | |
| 12 | Image | Plano | — | | | | |

Reference wavelength (d-line) is 587.6 nm.

TABLE 10

Aspheric Coefficients

| | Surface # | | | |
|---|---|---|---|---|
| | 1 | 2 | 4 | 5 |
| k = | −6.02550E−01 | −6.02771E−01 | 2.05649E+00 | −2.43994E+00 |
| A4 = | −8.00537E−04 | −7.96201E−03 | −8.32685E−02 | −1.26999E−01 |
| A6 = | −2.47387E−03 | −6.97705E−03 | −1.10373E−02 | 5.00147E−02 |
| A8 = | 3.21218E−04 | 1.58009E−03 | −5.48688E−02 | −3.26737E−02 |
| A10 = | −1.21468E−05 | −1.08210E−04 | 4.65940E−02 | 1.22631E−02 |

| | Surface # | | | |
|---|---|---|---|---|
| | 6 | 7 | 8 | 9 |
| k = | −1.00000E+00 | −5.06520E+00 | −1.37260E+01 | −7.75465E−01 |
| A4 = | −1.60354E−01 | −6.13151E−02 | 7.72693E−02 | 3.66480E−02 |
| A6 = | 5.36818E−02 | 2.13206E−02 | −1.86870E−02 | −6.59755E−03 |
| A8 = | 3.86557E−04 | −5.46537E−03 | 2.06724E−04 | 3.08948E−03 |
| A10 = | −2.61480E−03 | 3.07192E−05 | 1.57797E−04 | |

In the image capturing lens system according to the fifth embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the fifth embodiment. Moreover, these parameters can be calculated from Table 9 as the following values and satisfy the following relationships:

| f (mm) | 2.74 | |R6 − R7|/f | 1.83 |
|---|---|---|---|
| Fno | 2.20 | f2/f4 | 0.75 |
| HFOV (deg.) | 38.0 | (f/f1) + (f/f2) | 1.13 |
| V2 − V3 | 32.4 | (f/f3) + (f/f4) | 0.01 |
| N3 | 1.633 | SD/TD | 0.46 |
| T34/T23 | 3.31 | Yz/ImgH | 0.62 |
| R4/CT2 | −0.80 | | |

Figure 11:
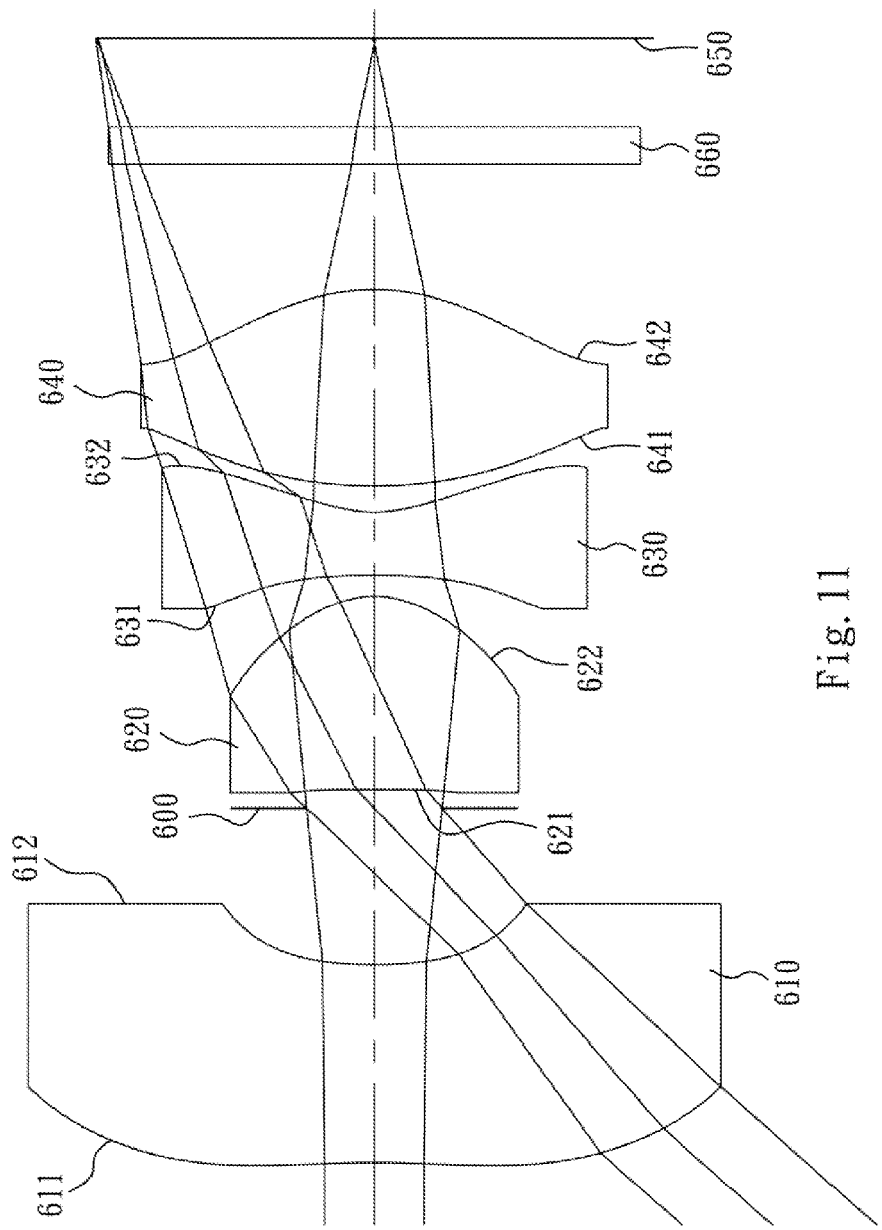
FIG. 11 is a schematic view of an image capturing lens system according to the sixth lens embodiment of the present disclosure.
Figure 12:
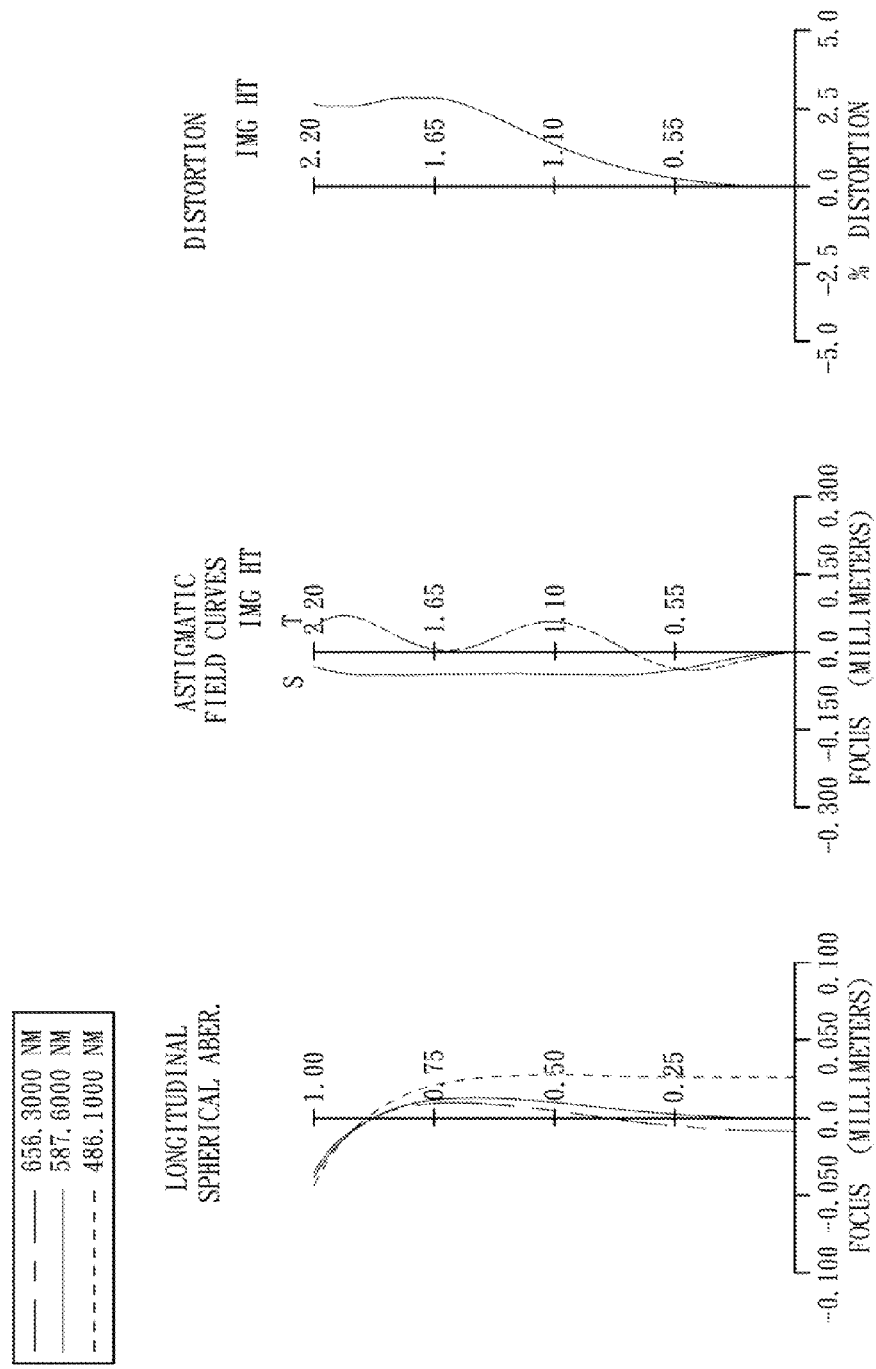
FIG. 12 shows spherical aberration curves, astigmatic field curves and a distortion curve of the image capturing lens system according to the sixth embodiment.

FIG. 11 is a schematic view of an image capturing lens system according to the sixth lens embodiment of the present disclosure. FIG. 12 shows spherical aberration curves, astigmatic field curves and a distortion curve of the image capturing lens system according to the sixth embodiment. In FIG. 11, the image capturing lens system includes, in order from an object side to an image side, the first lens element 610, an aperture stop 600, the second lens element 620, the third lens element 630, the fourth lens element 640, an IR cut filter 660 and an image plane 650.

The first lens element 610 with negative refractive power has a concave object-side surface 611 and a concave image-side surface 612, and is made of glass. The object-side surface 611 and the image-side surface 612 of the first lens element 610 are aspheric.

The second lens element 620 with positive refractive power has a to concave object-side surface 621 and a convex image-side surface 622, and is made of plastic material. The object-side surface 621 and the image-side surface 622 of the second lens element 620 are aspheric.

The third lens element 630 with negative refractive power has a concave object-side surface 631 and a concave image-side surface 632, and is made of plastic material. The object-side surface 631 and the image-side surface 632 of the third lens element 630 are aspheric.

The fourth lens element 640 with positive refractive power has a convex object-side surface 641 and a convex image-side surface 642, and is made of plastic material. The object-side surface 641 and the image-side surface 642 of the fourth lens element 640 are aspheric. Furthermore, the fourth lens element 640 has inflection points formed on the object-side surface 641 and the image-side surface 642 thereof.

The IR cut filter 660 is located between the fourth lens element 640 and the image plane 650, and will not affect the focal length of the image capturing lens system.

The equation of the aspheric surface profiles of the above lens elements of the sixth embodiment is the same as that of the first embodiment, and will not be stated herein again.

The detailed optical data of the sixth embodiment are shown in Table 11 and the aspheric surface data are shown in Table 12 below.

TABLE 11

6th Embodiment
f = 1.90 mm, Fno = 2.40, HFOV = 48.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −9.507000 (ASP) | 1.576 | Glass | 1.569 | 56.1 | −4.23 |
| 2 | | 3.411300 (ASP) | 1.251 | | | | |
| 3 | Ape. Stop | Plano | 0.150 | | | | |
| 4 | Lens 2 | −100.000000 (ASP) | 1.543 | Plastic | 1.535 | 56.3 | 1.38 |
| 5 | | −0.738550 (ASP) | 0.167 | | | | |
| 6 | Lens 3 | −6.018000 (ASP) | 0.500 | Plastic | 1.614 | 25.6 | −1.37 |
| 7 | | 1.011520 (ASP) | 0.212 | | | | |
| 8 | Lens 4 | 3.559400 (ASP) | 1.564 | Plastic | 1.535 | 56.3 | 2.46 |
| 9 | | −1.762900 (ASP) | 1.000 | | | | |
| 10 | IR-filter | Plano | 0.300 | Glass | 1.517 | 64.2 | — |
| 11 | | Plano | 0.705 | | | | |
| 12 | Image | Plano | — | | | | |

Reference wavelength (d-line) is 587.6 nm.

TABLE 12

Aspheric Coefficients

| | Surface # | | | |
|---|---|---|---|---|
| | 1 | 2 | 4 | 5 |
| k = | −1.00000E+00 | −2.70689E+00 | −1.68162E+01 | −2.82234E+00 |
| A4 = | 3.53040E−02 | 4.51212E−02 | −1.07372E−01 | −1.64736E−01 |
| A6 = | −5.04900E−03 | 2.26284E−01 | 6.47664E−02 | 5.40315E−02 |
| A8 = | 4.97684E−04 | −3.02986E−01 | −3.77138E−01 | −4.38622E−02 |
| A10 = | −2.16129E−05 | 1.88768E−01 | 4.37744E−01 | 1.00789E−02 |
| A12 = | 3.22288E−07 | −4.07429E−02 | | |

| | Surface # | | | |
|---|---|---|---|---|
| | 6 | 7 | 8 | 9 |
| k = | 1.62671E+01 | −6.71404E+00 | −1.21394E+01 | −5.34052E−01 |
| A4 = | −6.26836E−02 | −2.81189E−02 | 3.85886E−02 | 2.99113E−02 |
| A6 = | 1.56306E−02 | 9.48768E−03 | −1.15614E−02 | −5.42306E−04 |
| A8 = | 2.88303E−03 | −2.45078E−03 | 3.25562E−04 | 2.66125E−03 |
| A10 = | 2.74280E−04 | −2.52920E−04 | 8.33952E−04 | −2.99724E−04 |
| A12 = | 6.66526E−04 | 5.01832E−05 | −1.72403E−04 | −3.87898E−06 |

In the image capturing lens system according to the sixth embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the sixth embodiment. Moreover, these parameters can be calculated from Table 11 as the following values and satisfy the following relationships:

| | | | |
|---|---|---|---|
| f (mm) | 1.90 | |R6 − R7|/f | 1.34 |
| Fno | 2.40 | f2/f4 | 0.56 |
| HFOV (deg.) | 48.4 | (f/f1) + (f/f2) | 0.92 |
| V2 − V3 | 30.7 | (f/f3) + (f/f4) | −0.61 |
| N3 | 1.614 | SD/TD | 0.59 |
| T34/T23 | 1.27 | Yz/ImgH | 0.55 |
| R4/CT2 | −0.48 | | |

Figure 13:
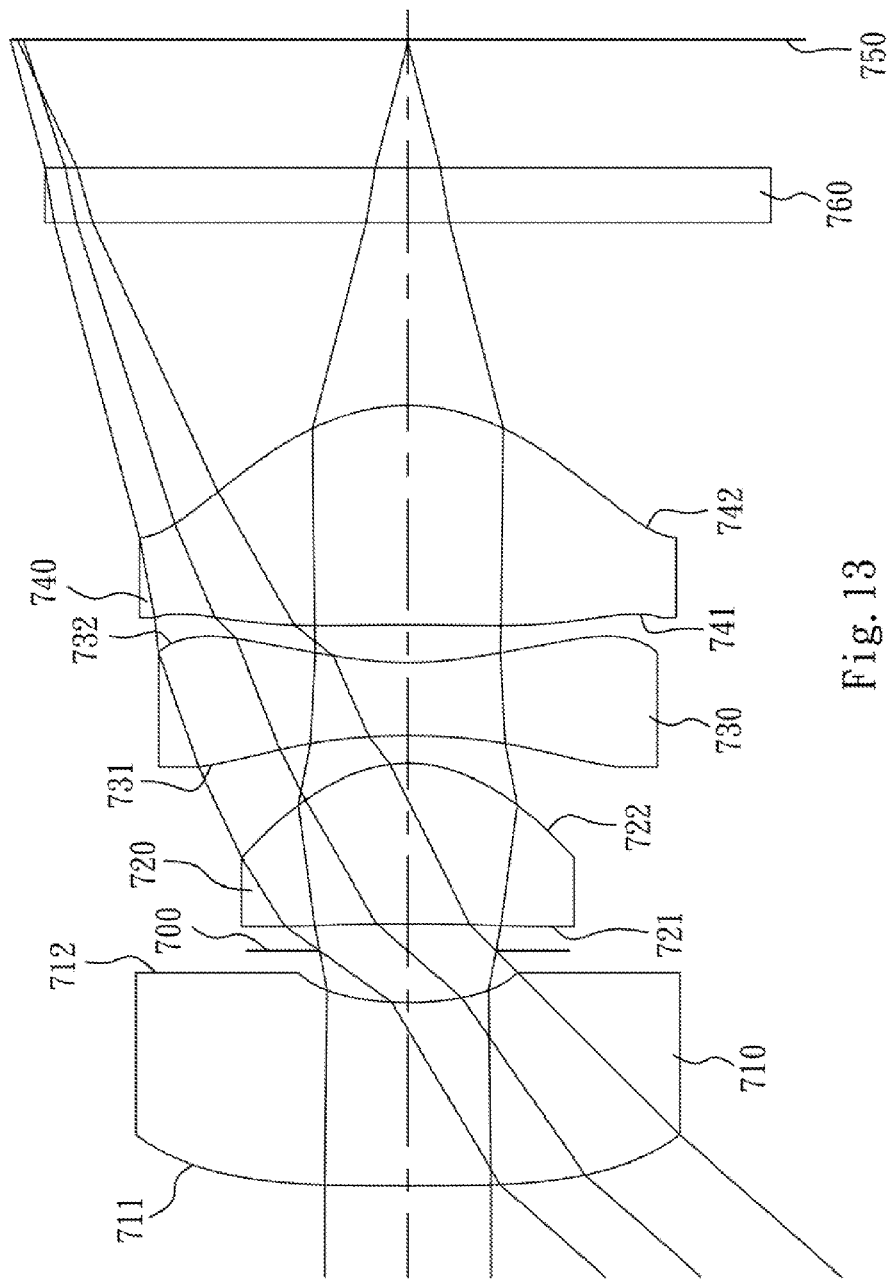
FIG. 13 is a schematic view of an image capturing lens system according to the seventh lens embodiment of the present disclosure.
Figure 14:
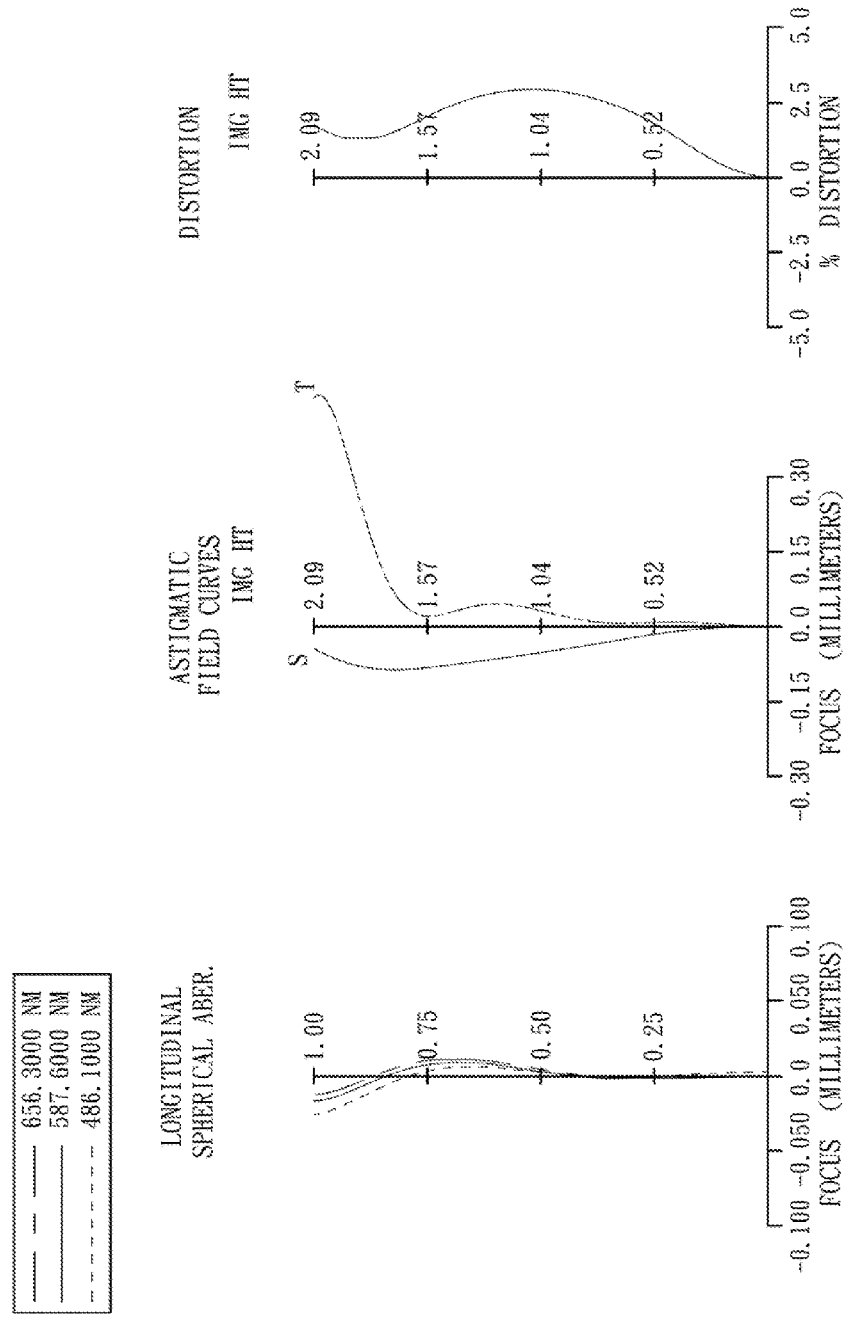
FIG. 14 shows spherical aberration curves, astigmatic field curves and a distortion curve of the image capturing lens system according to the seventh embodiment.

FIG. 13 is a schematic view of an image capturing lens system according to the seventh lens embodiment of the present disclosure. FIG. 14 shows spherical aberration curves, astigmatic field curves and a distortion curve of the image capturing lens system according to the seventh embodiment. In FIG. 13, the image capturing lens system includes, in order from an object side to an image side, the first lens element 710, an aperture stop 700, the second lens element 720, the third lens element 730, the fourth lens element 740, an IR cut filter 760 and an image plane 750.

The first lens element 710 with negative refractive power has a convex object-side surface 711 and a concave image-side surface 712, and is made of glass. The object-side surface 711 and the image-side surface 712 of the first lens element 710 are aspheric.

The second lens element 720 with positive refractive power has a concave object-side surface 721 and a convex image-side surface 722, and is made of plastic material. The object-side surface 721 and the image-side surface 722 of the second lens element 720 are aspheric.

The third lens element 730 with negative refractive power has a concave object-side surface 731 and a concave image-side surface 732, and is made of plastic material. The object-side surface 731 and the image-side surface 732 of the third lens element 730 are aspheric.

The fourth lens element 740 with positive refractive power has a concave object-side surface 741 and a convex image-side surface 742, and is made of plastic material. The object-side surface 741 and the image-side surface 742 of the fourth lens element 740 are aspheric. Furthermore, the fourth lens element 740 has inflection points formed on the object-side surface 741 and the image-side surface 742 thereof.

The IR cut filter 760 is located between the fourth lens element 740 and the image plane 750, and will not affect the focal length of the image capturing lens system.

The equation of the aspheric surface profiles of the above lens elements of the seventh embodiment is the same as that of the first embodiment, and will not be stated herein again.

The detailed optical data of the seventh embodiment are shown in Table 13 and the aspheric surface data are shown in Table 14 below.

TABLE 13

7th Embodiment
f = 1.82 mm, Fno = 2.00, HFOV = 48.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 40.000000 (ASP) | 1.000 | Glass | 1.523 | 51.5 | −3.78 |
| 2 | | 1.869990 (ASP) | 0.282 | | | | |
| 3 | Ape. Stop | Plano | 0.150 | | | | |
| 4 | Lens 2 | −20.000000 (ASP) | 0.876 | Plastic | 1.535 | 56.3 | 1.44 |
| 5 | | −0.750280 (ASP) | 0.150 | | | | |
| 6 | Lens 3 | −3.697200 (ASP) | 0.400 | Plastic | 1.614 | 25.6 | −2.01 |
| 7 | | 1.935530 (ASP) | 0.206 | | | | |
| 8 | Lens 4 | −11.028400 (ASP) | 1.200 | Plastic | 1.535 | 56.3 | 2.10 |
| 9 | | −1.059610 (ASP) | 1.000 | | | | |
| 10 | IR-filter | Plano | 0.300 | Glass | 1.517 | 64.2 | — |
| 11 | | Plano | 0.700 | | | | |
| 12 | Image | Plano | — | | | | |

Reference wavelength (d-line) is 587.6 nm.

TABLE 14

Aspheric Coefficients

| Surface # | | | |
|---|---|---|---|
| 1 | 2 | 4 | 5 |

| | 1 | 2 | 4 | 5 |
|---|---|---|---|---|
| k = | −1.00000E+00 | −1.09253E+01 | 3.00000E+00 | −1.82476E+00 |
| A4 = | 6.87193E−02 | 5.58833E−01 | −9.65654E−02 | −9.96848E−02 |
| A6 = | −2.06158E−02 | −9.57665E−02 | 8.67531E−02 | 4.34267E−02 |
| A8 = | 5.54629E−03 | −1.84398E+00 | 2.32766E−01 | −2.76853E−01 |
| A10 = | 1.01782E−04 | 7.81177E+00 | −1.63577E−01 | 2.53834E−01 |

| Surface # | | | |
|---|---|---|---|
| 6 | 7 | 8 | 9 |

| | 6 | 7 | 8 | 9 |
|---|---|---|---|---|
| k = | 5.87987E+00 | −1.56701E+01 | −1.26325E+00 | −7.06256E−01 |
| A4 = | −5.59726E−02 | −1.93859E−02 | 1.18729E−01 | 6.67775E−02 |
| A6 = | 5.95005E−02 | 1.46020E−02 | −3.63034E−02 | −1.88968E−02 |
| A8 = | 1.57063E−02 | −1.46441E−02 | −3.88525E−03 | 2.06241E−02 |

TABLE 14-continued

| Aspheric Coefficients | | | | |
|---|---|---|---|---|
| A10 = | 7.38146E−04 | −3.83996E−03 | 1.74072E−03 | −1.37753E−03 |
| A12 = | −6.82394E−03 | 1.01789E−03 | −9.60298E−04 | |

In the image capturing lens system according to the seventh embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the seventh embodiment.

Moreover, these parameters can be calculated from Table 13 as the following values and satisfy the following relationships:

| | | | |
|---|---|---|---|
| f (mm) | 1.82 | |R6 − R7|/f | 7.12 |
| Fno | 2.00 | f2/f4 | 0.68 |
| HFOV (deg.) | 48.6 | (f/f1) + (f/f2) | 0.79 |
| V2 − V3 | 30.7 | (f/f3) + (f/f4) | −0.04 |
| N3 | 1.614 | SD/TD | 0.70 |
| T34/T23 | 1.37 | Yz/ImgH | 0.50 |
| R4/CT2 | −0.86 | | |

Figure 15:
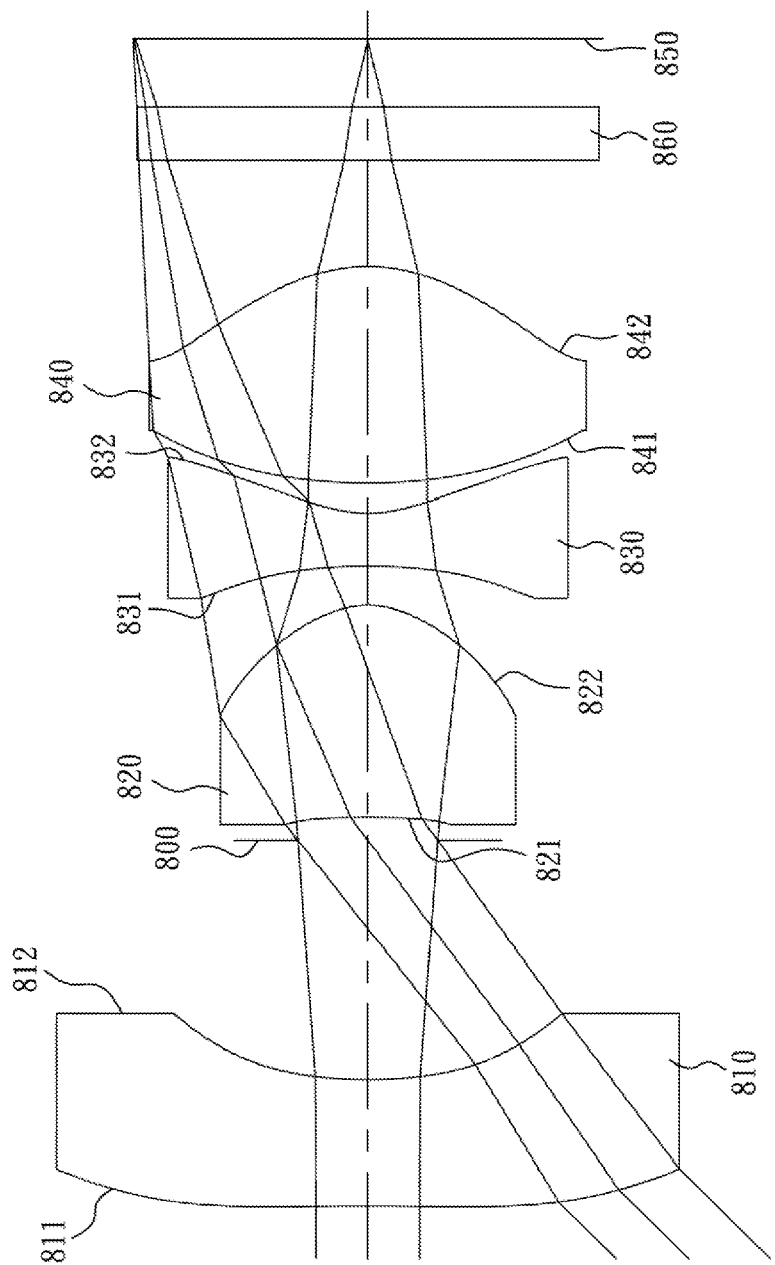
FIG. 15 is a schematic view of an image capturing lens system according to the eighth lens embodiment of the present disclosure.
Figure 16:
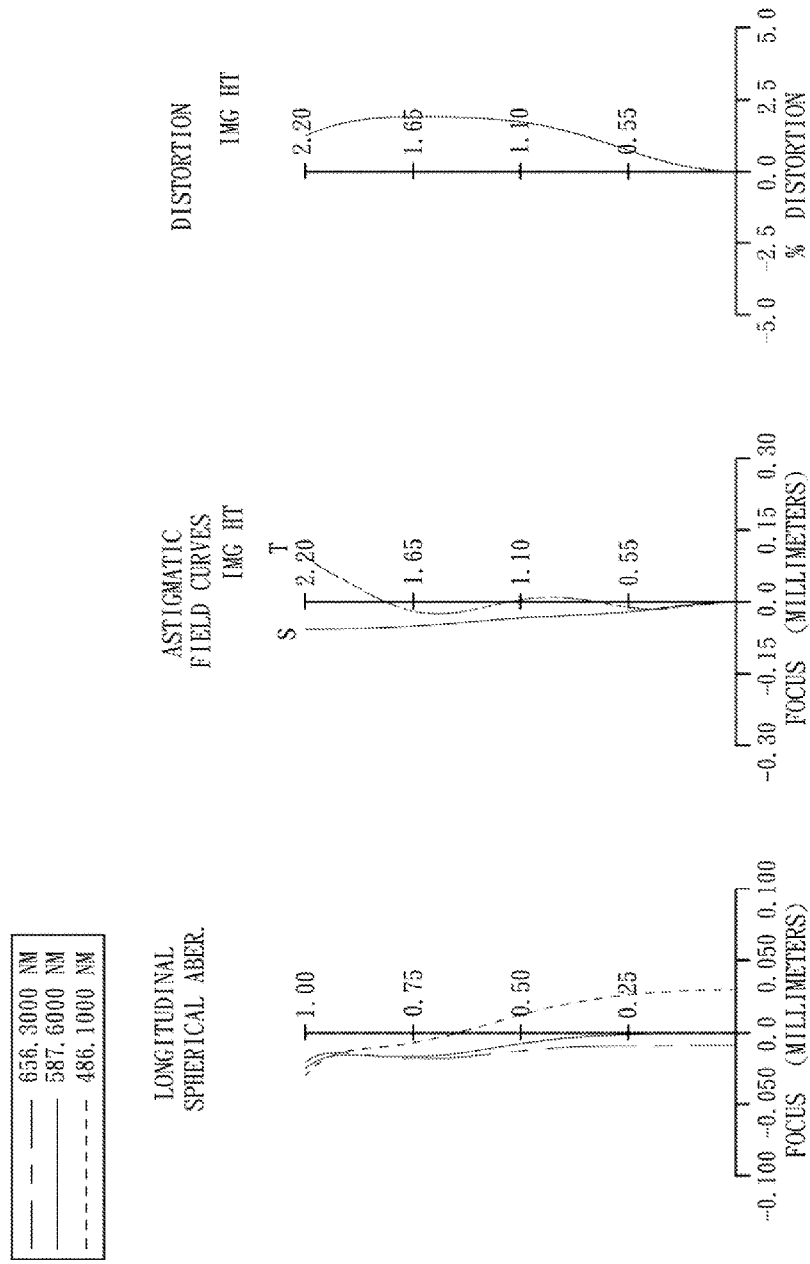
FIG. 16 shows spherical aberration curves, astigmatic field curves and a distortion curve of the image capturing lens system according to the eighth embodiment.

FIG. 15 is a schematic view of an image capturing lens system according to the eighth lens embodiment of the present disclosure. FIG. 16 shows spherical aberration curves, astigmatic field curves and a distortion curve of the image capturing lens system according to the eighth embodiment. In FIG. 15, the image capturing lens system includes, in order from an object side to an image side, the first lens element 810, an aperture stop 800, the second lens element 820, the third lens element 830, the fourth lens element 840, an IR cut filter 860 and an image plane 850.

The first lens element 810 with negative refractive power has a concave object-side surface 811 and a concave image-side surface 812, and is made of plastic material. The object-side surface 811 and the image-side surface 812 of the first lens element 810 are aspheric.

The second lens element 820 with positive refractive power has a concave object-side surface 821 and a convex image-side surface 822, and is made of plastic material. The object-side surface 821 and the image-side surface 822 of the second lens element 820 are aspheric.

The third lens element 830 with negative refractive power has a concave object-side surface 831 and a concave image-side surface 832, and is made of plastic material. The object-side surface 831 and the image-side surface 832 of the third lens element 830 are aspheric.

The fourth lens element 840 with positive refractive power has a convex object-side surface 841 and a convex image-side surface 842, and is made of plastic material. The object-side surface 841 and the image-side surface 842 of the fourth lens element 840 are aspheric. Furthermore, the fourth lens element 840 has inflection points formed on the image-side surface 842 thereof.

The IR cut filter 860 is located between the fourth lens element 840 and the image plane 850, and will not affect the focal length of the image capturing lens system.

The equation of the aspheric surface profiles of the above lens elements of the eighth embodiment is the same as that of the first embodiment, and will not be stated herein again.

The detailed optical data of the eighth embodiment are shown in Table 15 and the aspheric surface data are shown in Table 16 below.

TABLE 15

8th Embodiment
f = 2.15 mm, Fno = 2.20, HFOV = 45.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −26.394600 (ASP) | 1.192 | Plastic | 1.530 | 55.8 | −6.83 |
| 2 | | 4.258100 (ASP) | 2.251 | | | | |
| 3 | Ape. Stop | Plano | 0.219 | | | | |
| 4 | Lens 2 | −11.444700 (ASP) | 2.000 | Plastic | 1.530 | 55.8 | 1.60 |
| 5 | | −0.837170 (ASP) | 0.364 | | | | |
| 6 | Lens 3 | −5.324000 (ASP) | 0.500 | Plastic | 1.634 | 23.8 | −1.44 |
| 7 | | 1.142080 (ASP) | 0.283 | | | | |
| 8 | Lens 4 | 5.339300 (ASP) | 2.042 | Plastic | 1.530 | 55.8 | 2.55 |
| 9 | | −1.571160 (ASP) | 1.000 | | | | |
| 10 | IR-filter | Plano | 0.500 | Glass | 1.517 | 64.2 | — |
| 11 | | Plano | 0.644 | | | | |
| 12 | Image | Plano | — | | | | |

Reference wavelength (d-line) is 587.6 nm.

TABLE 16

| Aspheric Coefficients | | | | |
|---|---|---|---|---|
| | Surface # | | | |
| | 1 | 2 | 4 | 5 |
| k = | −2.00000E+01 | 3.00000E+00 | 3.00000E+00 | −2.50112E+00 |
| A4 = | 1.13542E−02 | 9.95189E−03 | −8.92555E−02 | −8.17578E−02 |
| A6 = | −6.61062E−04 | 2.94697E−03 | 6.02578E−02 | 8.19790E−03 |

TABLE 16-continued

| Aspheric Coefficients | | | | |
|---|---|---|---|---|
| A8 = | 1.78965E−05 | −3.46254E−04 | −2.59106E−01 | −2.47377E−03 |
| A10 = | −2.96797E−07 | −1.86235E−04 | 1.70551E−01 | −1.91276E−03 |

| | Surface # | | | |
|---|---|---|---|---|
| | 6 | 7 | 8 | 9 |
| k = | −2.00000E+01 | −6.43510E+00 | 1.39354E+00 | −1.02822E+00 |
| A4 = | −3.22492E−02 | −1.15179E−02 | 9.54218E−03 | 2.77301E−02 |
| A6 = | 5.56022E−04 | 3.95529E−03 | −2.34703E−03 | −6.30725E−03 |
| A8 = | 2.01451E−03 | −9.20852E−04 | 2.02828E−04 | 1.32246E−03 |
| A10 = | −1.54148E−04 | 3.51251E−05 | 1.50457E−05 | |

In the image capturing lens system according to the eighth embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the eighth embodiment. Moreover, these parameters can be calculated from Table 15 as the following values and satisfy the following relationships:

| f (mm) | 2.15 | |R6 − R7|/f | 1.95 |
|---|---|---|---|
| Fno | 2.20 | f2/f4 | 0.63 |
| HFOV (deg.) | 45.4 | (f/f1) + (f/f2) | 1.03 |
| V2 − V3 | 32.0 | (f/f3) + (f/f4) | −0.65 |
| N3 | 1.634 | SD/TD | 0.61 |
| T34/T23 | 0.78 | Yz/ImgH | 0.68 |
| R4/CT2 | −0.42 | | |

Figure 17:
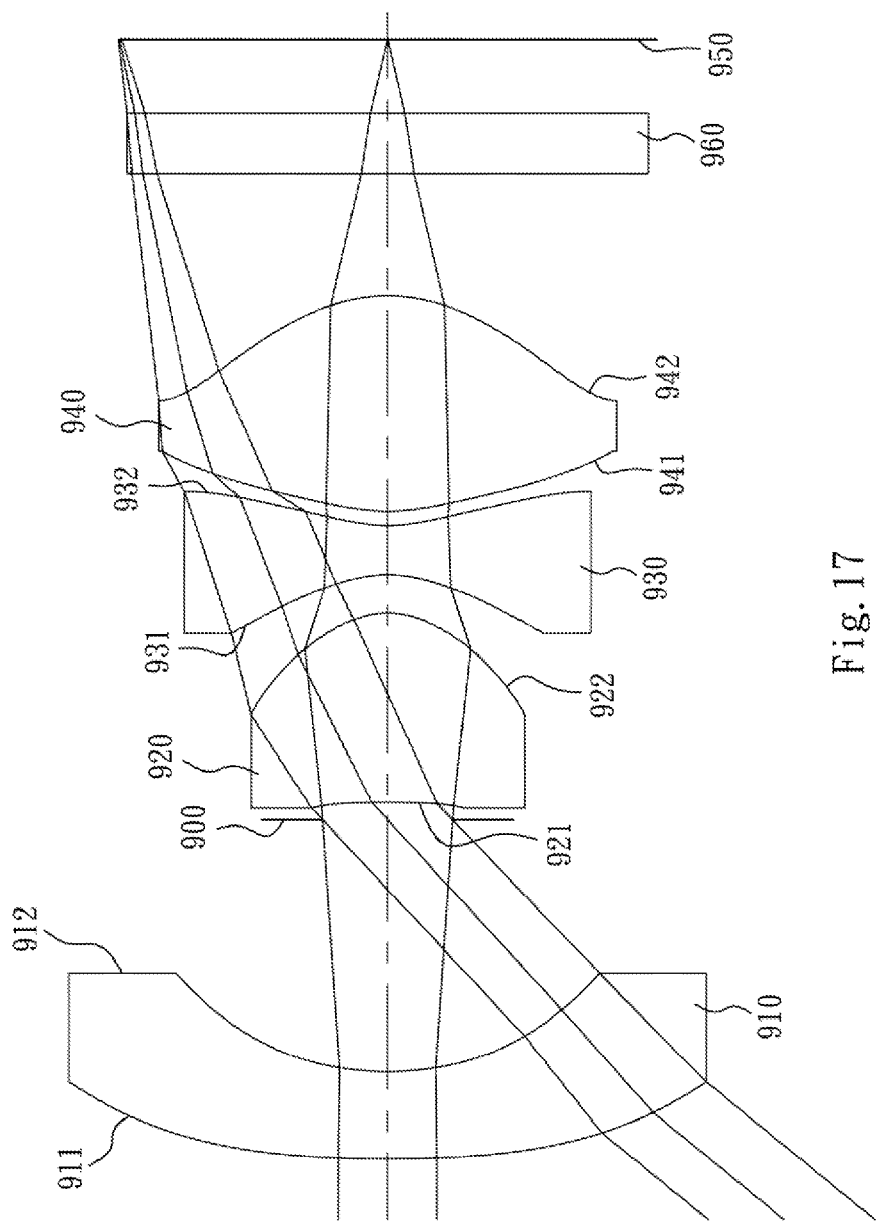
FIG. 17 is a schematic view of an image capturing lens system according to the ninth lens embodiment of the present disclosure.
Figure 18:
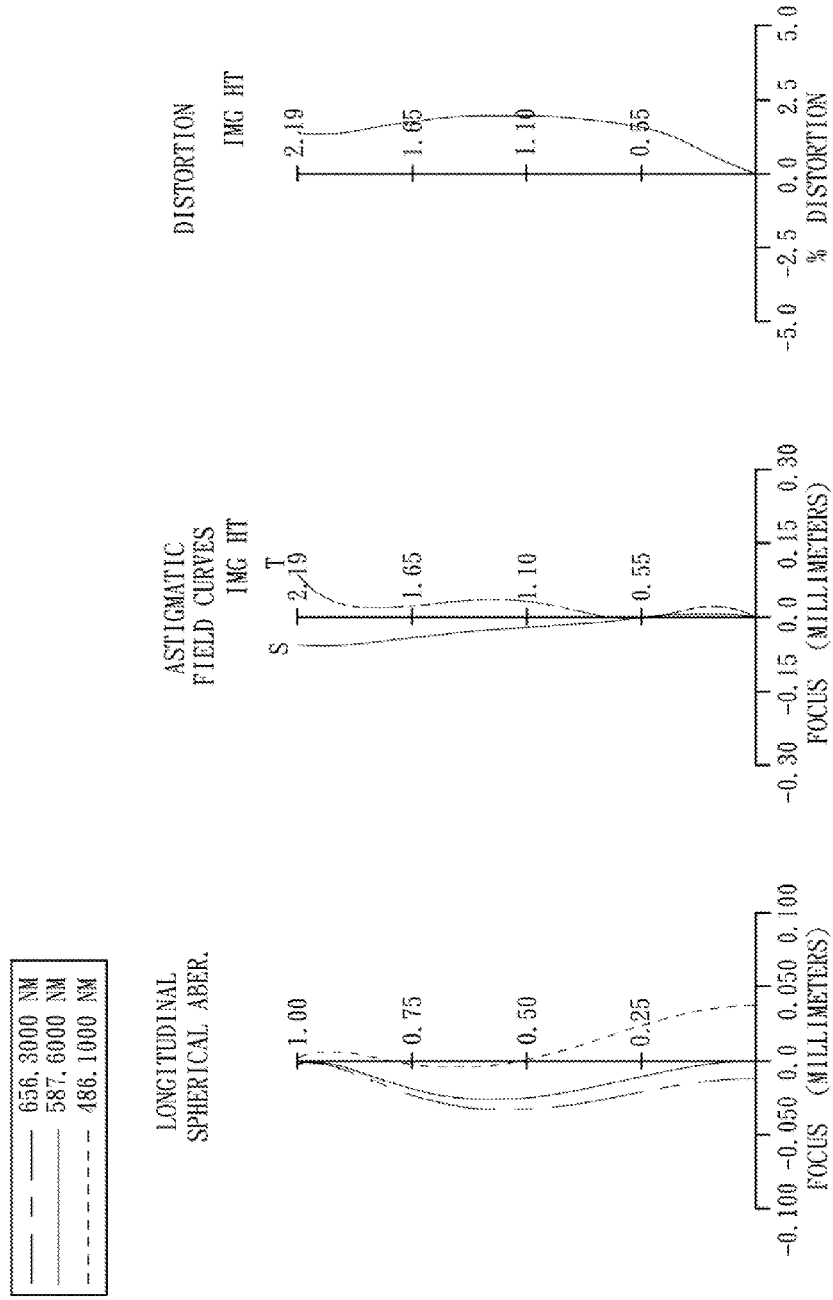
FIG. 18 shows spherical aberration curves, astigmatic field curves and a distortion curve of the image capturing lens system according to the ninth embodiment.

FIG. 17 is a schematic view of an image capturing lens system according to the ninth lens embodiment of the present disclosure. FIG. 18 shows spherical aberration curves, astigmatic field curves and a distortion curve of the image capturing lens system according to the ninth embodiment. In FIG. 17, the image capturing lens system includes, in order from an object side to an image side, the first lens element 910, an aperture stop 900, the second lens element 920, the third lens element 930, the fourth lens element 940, an IR cut filter 960 and an image plane 950.

The first lens element 910 with negative refractive power has a convex object-side surface 911 and a concave image-side surface 912, and is made of plastic material. The object-side surface 911 and the image-side surface 912 of the first lens element 910 are aspheric.

The second lens element 920 with positive refractive power has a concave object-side surface 921 and a convex image-side surface 922, and is made of plastic material.

The third lens element 930 with negative refractive power has a concave object-side surface 931 and a concave image-side surface 932, and is made of plastic material. The object-side surface 931 and the image-side surface 932 of the third lens element 930 are aspheric.

The fourth lens element 940 with positive refractive power has a convex object-side surface 941 and a convex image-side surface 942, and is made of plastic material. The object-side surface 941 and the image-side surface 942 of the fourth lens element 940 are aspheric. Furthermore, the fourth lens element 940 has inflection points formed on the image-side surface 942 thereof.

The IR cut filter 960 is located between the fourth lens element 940 and the image plane 950, and will not affect the focal length of the image capturing H) lens system.

The equation of the aspheric surface profiles of the above lens elements of the ninth embodiment is the same as that of the first embodiment, and will not be stated herein again.

The detailed optical data of the ninth embodiment are shown in Table 17 and the aspheric surface data are shown in Table 18 below.

TABLE 17

9th Embodiment
f = 1.78 mm, Fno = 2.20, HFOV = 50.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 11.960300 (ASP) | 0.717 | Plastic | 1.535 | 56.3 | −6.06 |
| 2 | | 2.495690 (ASP) | 2.070 | | | | |
| 3 | Ape. Stop | Plano | 0.145 | | | | |
| 4 | Lens 2 | −9.878500 (ASP) | 1.555 | Plastic | 1.535 | 56.3 | 1.27 |
| 5 | | −0.669270 (ASP) | 0.316 | | | | |
| 6 | Lens 3 | −1.029670 (ASP) | 0.400 | Plastic | 1.607 | 26.6 | −0.81 |
| 7 | | 1.073990 (ASP) | 0.118 | | | | |
| 8 | Lens 4 | 1.290180 (ASP) | 1.777 | Plastic | 1.535 | 56.3 | 1.61 |
| 9 | | −1.333790 (ASP) | 1.000 | | | | |
| 10 | IR-filter | Plano | 0.500 | Glass | 1.517 | 64.2 | — |
| 11 | | Plano | 0.602 | | | | |
| 12 | Image | Plano | — | | | | |

Reference wavelength (d-line) is 587.6 nm.

TABLE 18

Aspheric Coefficients

| | Surface # | | | |
|---|---|---|---|---|
| | 1 | 2 | 4 | 5 |
| k = | 3.00000E+00 | −5.31971E−03 | −1.42410E+01 | −2.31528E+00 |
| A4 = | 9.76518E−03 | 1.25356E−02 | −1.35093E−01 | −1.09211E−01 |
| A6 = | −4.30502E−04 | 1.25394E−03 | 3.80655E−02 | −9.74569E−03 |
| A8 = | 2.52885E−06 | 2.24508E−04 | −7.07670E−01 | 9.38469E−04 |
| A10 = | 3.01439E−07 | −2.68964E−04 | 7.28094E−01 | −1.58212E−02 |

| | Surface # | | | |
|---|---|---|---|---|
| | 6 | 7 | 8 | 9 |
| k = | −5.50718E+00 | −1.52287E+01 | −2.00000E+01 | −1.05412E+00 |
| A4 = | −4.49345E−02 | −1.48106E−02 | 1.25664E−02 | 2.45512E−02 |
| A6 = | 6.15831E−03 | 4.87647E−03 | −1.63343E−03 | −4.18749E−03 |
| A8 = | 3.66338E−03 | −1.12594E−03 | 3.86538E−04 | 1.93976E−03 |
| A10 = | 2.55534E−04 | −8.44516E−05 | 2.26974E−07 | |

In the image capturing lens system according to the ninth embodiment, the definitions of f, Fno, HFOV, V2, V3, N3, T23, T34, CT2, R4, R6, R7, f1, f2, f3, f4, SD, TD, Yz and ImgH are the same as those stated in the first embodiment with corresponding values for the ninth embodiment. Moreover, these parameters can be calculated from Table 17 as the following values and satisfy the following relationships:

| f (mm) | 1.78 | $|R6 - R7|/f$ | 0.12 |
|---|---|---|---|
| Fno | 2.20 | f2/f4 | 0.79 |
| HFOV (deg.) | 50.7 | (f/f1) + (f/f2) | 1.11 |
| V2 − V3 | 29.7 | (f/f3) + (f/f4) | −1.10 |
| N3 | 1.607 | SD/TD | 0.61 |
| T34/T23 | 0.37 | Yz/ImgH | 0.60 |
| R4/CT2 | −0.43 | | |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing lens system comprising, in order from an object side to an image side:
   a first lens element with negative refractive power having a convex object-side surface and a concave image-side surface;
   a second lens element with positive refractive power having a concave object-side surface and a convex image-side surface;
   a third lens element with negative refractive power made of plastic material, and having a concave image-side surface, wherein an object-side to surface and the image-side surface of the third lens element are aspheric; and
   a fourth lens element with positive refractive power made of plastic material, wherein an object-side surface and an image-side surface of the fourth lens element are aspheric;
   wherein the image capturing lens system further comprises a stop between the first lens element and the second lens element, a focal length of the image capturing lens system is f, a curvature radius of the image-side surface of the third lens element is R6, and a curvature radius of the object-side surface of the fourth lens element is R7, the following relationship is satisfied:

$0.1 < |R6 - R7|/f$.

2. The image capturing lens system of claim 1, wherein the fourth lens element has a convex image-side surface.

3. The image capturing lens system of claim 2, wherein the fourth lens element has at least one inflection point formed on at least one of the object-side surface and the image-side surface thereof.

4. The image capturing lens system of claim 2, wherein from the first lens element to the fourth lens element are non-cemented lens elements, an axial distance between the stop and the image-side surface of the fourth lens element is SD, and an axial distance between the object-side surface of the first lens element and the image-side surface of the fourth lens element is TD, the following relationship is satisfied:

$0.3 < SD/TD < 0.8$.

5. The image capturing lens system of claim 3, wherein the Abbe number of the second lens element is V2, and the Abbe number of the third lens element is V3, the following relationship is satisfied:

$25 < V2 - V3 < 45$.

6. The image capturing lens system of claim 5, wherein a focal length of the second lens element is f2, and a focal length of the fourth lens element is f4, the following relationship is satisfied:

$0.4 < f2/f4 < 1.0$.

7. The image capturing lens system of claim 5, wherein a curvature radius of the image-side surface of the second lens element is R4, and a central thickness of the second lens element is CT2, the following relationship is satisfied:

$-1.3 < R4/CT2 < -0.2$.

8. The image capturing lens system of claim 4, wherein an axial distance between the second lens element and the third lens element is T23, and an axial distance between the third lens element and the fourth lens element is T34, the following relationship is satisfied:

$0.2 < T34/T23 < 5.0$.

9. The image capturing lens system of claim 4, wherein the focal length of the image capturing lens system is f, the curvature radius of the image-side surface of the third lens element is R6, and the curvature radius of the object-side surface of the fourth lens element is R7, the following relationship is satisfied:

$$0.5<|R6-R7|/f.$$

10. The image capturing lens system of claim 9, wherein the focal length of the image capturing lens system is f, a focal length of the third lens element is f3, and a focal length of the fourth lens element is f4, the following relationship is satisfied:

$$-1.5<(f/f3)+(f/f4)<-0.2.$$

11. The image capturing lens system of claim 4, wherein the refractive index of the third lens element is N3, the following relationship is satisfied:

$$N3<1.8.$$

12. The image capturing lens system of claim 11, wherein the focal length of the image capturing lens system is f, a focal length of the first lens element is f1, and a focal length of the second lens element is f2, the following relationship is satisfied:

$$0.5<(f/f1)+(f/f2)<1.3.$$

13. An image capturing lens system comprising four non-cemented lens elements, in order from an object side to an image side:
   a first lens element with negative refractive power having a concave image-side surface;
   a second lens element with positive refractive power having a concave object-side surface and a convex image-side surface;
   a third lens element with negative refractive power made of plastic material, and having a concave image-side surface, wherein an object-side surface and the image-side surface of the third lens element are aspheric; and
   a fourth lens element with positive refractive power made of plastic material, wherein an object-side surface and an image-side surface of the fourth lens element are aspheric, and the fourth lens element has at least one inflection point formed on at least one of the object-side surface and the image-side surface thereof;
   wherein a maximum image height of the image capturing lens system is ImgH, and a vertical distance between the inflection point formed on the image-side surface of the fourth lens element and an optical axis is Yz, the following relationship is satisfied:

$$0.4<Yz/ImgH<1.0.$$

14. The image capturing lens system of claim 13, wherein the first lens element has a convex object-side surface, and the fourth lens element has a convex image-side surface.

15. The image capturing lens system of claim 13, wherein a curvature radius of the image-side surface of the second lens element is R4, and a central thickness of the second lens element is CT2, the following relationship is satisfied:

$$-1.3<R4/CT2<-0.2.$$

16. The image capturing lens system of claim 13, wherein the first lens element has a convex object-side surface, an axial distance between the second lens element and the third lens element is T23, and an axial distance between the third lens element and the fourth lens element is T34, the following relationship is satisfied:

$$0.2<T34/T23<5.0.$$

17. An image capturing lens system comprising four non-cemented lens elements, in order from an object side to an image side:
   a first lens element with negative refractive power having a concave image-side surface;
   a second lens element with positive refractive power having a concave object-side surface and a convex image-side surface;
   a third lens element with negative refractive power made of plastic material, and having a concave image-side surface, wherein an object-side surface and the image-side surface of the third lens element are aspheric; and
   a fourth lens element with positive refractive power made of plastic material, and having a convex image-side surface, wherein an object-side surface and the image-side surface of the fourth lens element are aspheric;
   wherein the refractive index of the third lens element is N3, the Abbe number of the second lens element is V2, and the Abbe number of the third lens element is V3, the following relationships are satisfied:

$$N3<1.8;\ and$$

$$25<V2-V3<45.$$

18. The image capturing lens system of claim 17, further comprising:
   a stop, wherein an axial distance between the stop and the image-side surface of the fourth lens element is SD, and an axial distance between the object-side surface of the first lens element and the image-side surface of the fourth lens element is TD, the following relationship is satisfied:

$$0.3<SD/TD<0.8.$$

19. The image capturing lens system of claim 18, wherein a maximum image height of the image capturing lens system is ImgH, the fourth lens element has at least one inflection point formed on at least one of the object-side surface and the image-side surface thereof, and a vertical distance between the inflection point formed on the image-side surface of the fourth lens element and an optical axis is Yz, the following relationship is satisfied:

$$0.4<Yz/ImgH<1.0.$$

20. The image capturing lens system of claim 17, wherein a focal length of the image capturing lens system is f, a curvature radius of the image-side surface of the third lens element is R6, and a curvature radius of the object-side surface of the fourth lens element is R7, the following relationship is satisfied:

$$0.5<|R6-R7|/f.$$

21. The image capturing lens system of claim 17, wherein a radius curvature of the image-side surface of the second lens element is R4, a central thickness of the second lens element is CT2, a focal length of the second lens element is f2, and a focal length of the fourth lens element is f4, the following relationship is satisfied:

$$-1.3<R4/CT2<-0.2;\ and$$

$$0.4<f2/f4<1.0.$$

* * * * *